US006774944B1

(12) United States Patent
Fukuyama

(10) Patent No.: US 6,774,944 B1
(45) Date of Patent: Aug. 10, 2004

(54) IMAGE TAKING APPARATUS

(75) Inventor: Hiroya Fukuyama, Sagamihara (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/005,139

(22) Filed: Jan. 9, 1998

(30) Foreign Application Priority Data

Jan. 10, 1997 (JP) .............................. 9-003281
Dec. 26, 1997 (JP) .............................. 9-359563

(51) Int. Cl.[7] .......................... G03B 13/00; G02B 13/16
(52) U.S. Cl. ...................... 348/345; 348/335; 359/372
(58) Field of Search ................................ 348/335, 345, 348/349, 348, 354, 357, 356, 79, 80, 218.1; 359/372, 381, 420, 663, 657, 796

(56) References Cited

U.S. PATENT DOCUMENTS 5,282,045 A * 1/1994 Mimura et al. ............. 348/345
5,351,152 A * 9/1994 Kuo et al. .................. 359/372
6,055,097 A * 4/2000 Lanni et al. ................ 359/386
6,201,899 B1 * 3/2001 Bergen ....................... 382/284

FOREIGN PATENT DOCUMENTS

| DE | 2301800 | 10/1974 |
| JP | 1-309478 | 12/1989 |
| JP | 5-27084 | 4/1993 |

* cited by examiner

Primary Examiner—Wendy R. Garber
Assistant Examiner—Jacqueline Wilson
(74) Attorney, Agent, or Firm—Ostrolenk, Faber, Gerb & Soffen, LLP

(57) ABSTRACT

Light rays emanating from an object are received by a first optical system, and converged to form intermediate images on a movable mirror to be driven to vibrate and at positions near the movable mirror. Light rays forming the intermediate images are converged to form a plurality of final images on the imaging surface of an imaging device by way of a second optical system. The resultant image data is added up and restored, whereby an image proving a large depth of field is produced and displayed on a monitor. Using this apparatus, even if an optical system suffering from a small depth of field is employed, an image providing a large depth of field can be produced.

28 Claims, 26 Drawing Sheets

IMAGE TAKING APPARATUS

BACKGROUND OF THE INVENTION

1. Field of the Invention

The present invention relates to an image taking apparatus capable of producing a plurality of images of objects to which distances are mutually different.

2. Description of the Related Art

In the past, various proposals have been made for an imaging apparatus offering a large depth of field and capable of acquiring an image which is in focus relative to positions of a three-dimensional object, even though the depth of field of the optical system small.

A microscope having of a large focal length and a large depth of field, which is one of the proposed imaging apparatuses, is an optical microscope using a varifocal lens, the shape of which is changed quickly by changing the internal pressure of poured transparent fluid, which is used as an objective lens. The microscope takes advantage of the fact that a human being perceives an afterimage and accordingly varies the focal point of the varifocal lens at a high speed in order to display an image provides a large depth of field in real time.

However, the varifocal lens employed in the known microscope having of a large focal length and a large depth of field has the focal point thereof varied when the poured transparent fluid is externally pressurized. A piezoelectric device is used as an actuator for varying the focal point. A high-voltage amplifier capable of providing an output voltage of about 100 V is therefore needed as a driving means for driving the actuator. Moreover, a glass diaphragm of about 10 micrometers thick is used as an optical device. Since these special components are required, the cost of the lens itself or drive unit, mass-productivity, and reliability are unsatisfactory.

An image input/output apparatus disclosed in Japanese Unexamined Patent Publication No. 1-309478 and proposed previously by this applicant is designed to convert an object image acquired through an imaging lens into an electrical image signal by means of an imaging device. The focal point of the imaging lens is shifted by means of a focal point control unit in order to acquire object image information with respect to a plurality of screens, each of which depict objects that are spaced by a given distance and are in focus. The object image information constituting the plurality of screens is then added up and filtered. This results in video information representing the screens that depict the objects which are in focus, and provides a large depth of field.

The image input/output apparatus disclosed in the Japanese Unexamined Patent Publication No. 1-309478 uses normal lenses to construct an optical system. When the normal lenses are used, four or five lenses are needed for attaining brightness inversely proportional to, for example, a square of an f-number F2.8. This kind of lens itself is heavy and its lens frame is heavy. Several seconds are therefore required for producing a plurality of images by driving a motor to shift the focal point of the optical system. In other words, several seconds are needed for producing one image which provides a large depth of field. It is difficult to speed up the operations and display an image in real time because of the large weights of the lens and lens frame.

The image input apparatuses described in Japanese Examined Patent Publication No. 5-27084 and Germany Patent Publication No. DT2301800 are designed to increase a depth of field by shifting the focus of an optical system during an exposure time. For shifting the focus, the former moves either a sample or lens barrel in a microscope along the optical axis of the optical system, while the latter moves an object on a vibrating table, along the optical axis.

However, these methods suffer from a drawback that real-time display is restricted or cannot be achieved. For displaying an image, which provides a large depth of field, at the rate of about 60 frames per second, the focus of an optical system must be shifted by driving a lens barrel so as to vibrate it at a frequency of at least 30 Hz. However, it is difficult to drive the lens barrel of a microscope so as to vibrate it at this frequency. Moreover, when an attempt is made to drive the object so as to vibrate it, the attempt would succeed only when the object is small enough and lightweight. When the sample is large and heavy, such driving is impossible to do.

SUMMARY OF THE INVENTION

The present invention is directed at solving the foregoing drawbacks. An object of the present invention is to provide an image taking apparatus that can produce various images of an object lying along an optical axis at a high speed even when the optical system of the apparatus has of a relatively small depth of field. The present invention does not employ any special device, and has a simple configuration. Another object of the present invention is to provide an image taking apparatus capable of producing an image, which provides a relatively large depth of field, irrespective of the size and weight of a sample that is an object.

According to one aspect of the invention, there is provided an image taking apparatus of the present invention comprising: an optical system structured so that mutually-parallel different reflecting surfaces can be sequentially or concurrently defined in order to sequentially or concurrently define different focal points; an imaging device for forming object images, which are acquired by setting the optical system to the different focal points or acquired by shifting the focus of the optical system within a range, on the imaging surface thereof, and producing image information representing the object images; and a depth-of-field adjustment element for reconstructing an image equivalent to an image, which is produced by an image taking apparatus offering a larger depth of field than a depth of field attained with the optical system set to one focal point, according to the image information, produced by the imaging device, representing the object images acquired by setting the optical system to the different focal points or by shifting the focus of the optical system within a range.

In the foregoing aspect of the invention, a plurality of object images are acquired by dynamically focusing the optical system at points within a given range or acquired by statically and concurrently focusing it at a plurality of points. The object images are formed on an imaging surface in order to produce image information. Based on the image information thus acquired, an image providing a large depth of field is reconstructed.

Other features and advantages of the present invention will be fully apparent from the description below.

BRIEF DESCRIPTION OF THE DRAWINGS

FIG. 21A shows a synthetic OTF, FIG. 21B shows an OTF characterizing an optical system that is brought into focus, and FIG. 21C shows the transfer function of the restoration filter;

DESCRIPTION OF THE PREFERRED EMBODIMENTS

Embodiments of the present invention will be described with reference to FIGS. 1–46.

Figure 1:
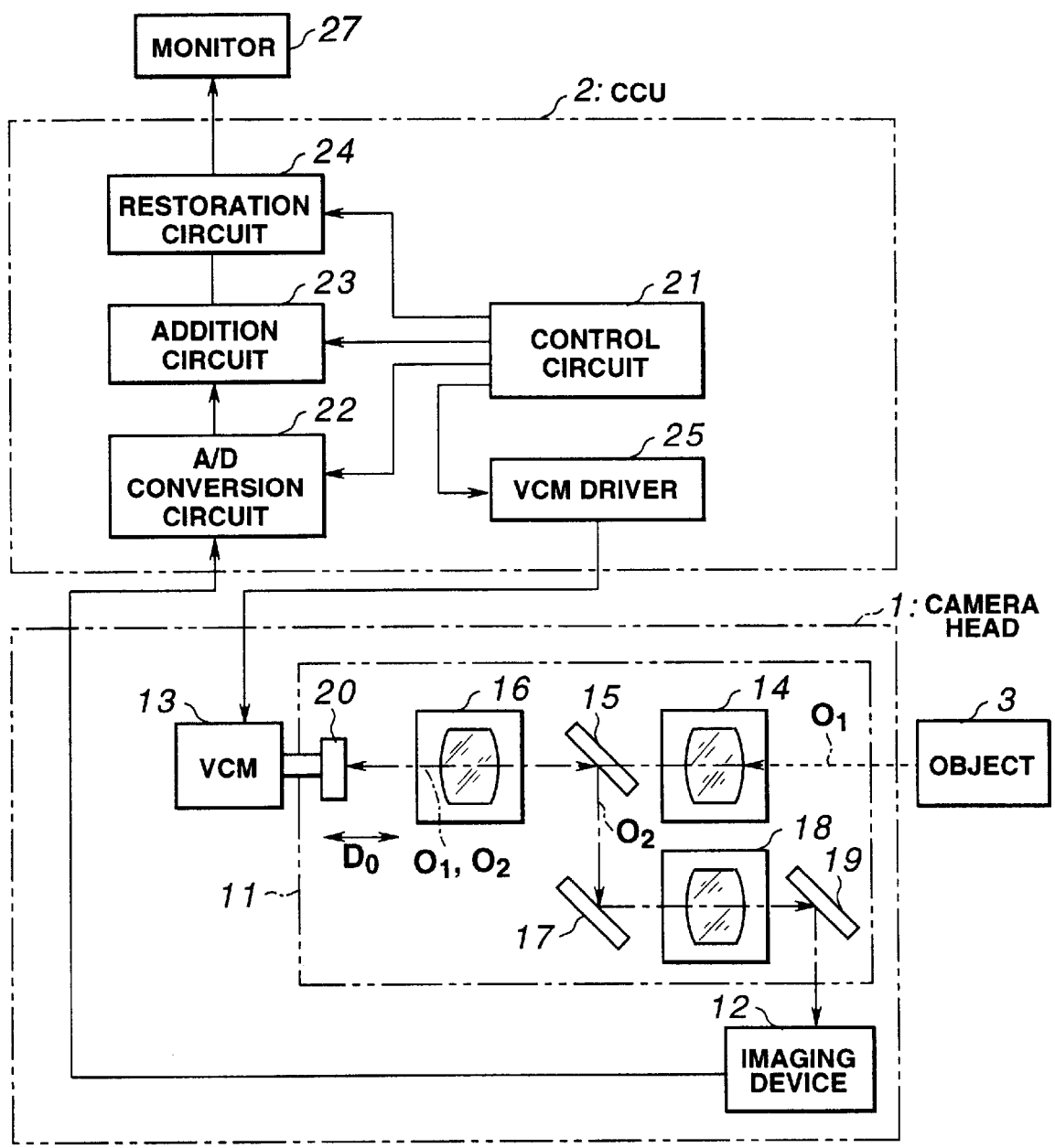
FIG. 1 is a block diagram showing the configuration of an image taking apparatus in accordance with the first embodiment of the present invention.

FIG. 1 is a block diagram showing the configuration of an image taking apparatus in accordance with the first embodiment of the present invention. The image taking apparatus of this embodiment can be adapted to an optical microscope capable of acquiring an image that provides a large depth of field. As shown in FIG. 1, the image taking apparatus consists mainly of a camera head 1 to be described later, a camera control unit (CCU) 2, and a monitor 27. An object 3 to be imaged by the apparatus is a three-dimensional object having an axis Z in the direction of an optical axis $0_1$ of a first optical system.

The camera head 1 consists mainly of an imaging optical system 11 for acquiring object light or light depicting an object and forming an image, an imaging device 12 serving as an imaging means and formed with a charge-coupled device (CCD) for converting an object image formed on the imaging surface thereof into an electrical signal or a charge-modulated device (CMD), and a voice coil motor (VCM) 13 that is an actuator serving as a mirror driving means for driving a movable mirror 20 so as to vibrate it.

The CCU 2 consists mainly of a control circuit 21 responsible for control of the whole apparatus and formed with a CPU or the like, an A/D conversion circuit 22 that is a circuit for processing an electrical signal output from the imaging device 12 and outputting image signals representing images contained in a plurality of screens defined in relation to given positions to which the movable mirror 20 is driven, an addition circuit 23 that is a depth-of-field adjustment element for adding up the image signals representing the images contained in the plurality of screens, and a restoration circuit 24 that is a depth-of-field adjustment element for restoring an image signal, which represents an image, which is contained in one screen and is in focus, from the additive image signals, and outputting the resultant video signal to the monitor 4, and a VCM driver 25 for driving the VCM 13.

Now, the foregoing components will be described. The imaging optical system 11 includes, as shown in FIG. 1 and FIG. 2 showing optical paths in the optical system, a first image formation lens frame 14 composed of groups of lenses 14a and 14b and an aperture stop 14c that is kept open, a half mirror 15, a field lens 16, a movable mirror 20 formed with a plane mirror to be driven to vibrate and make a parallel movement sequentially, a mirror 17 that is a plane mirror, a second image formation lens frame 18 composed of groups of lenses 18a and 18b, and a diaphragm 18c whose opening is adjustable, and a mirror 19 that is a plane mirror.

The first image formation lens frame 14, half mirror 15, and field lens 16 constitute a first optical system 11a. The field lens 16, half mirror 15, mirror 17, second image formation lens frame 18, and mirror 19 constitute a second optical system 11b. The mirrors included in the imaging optical system 11 are designed to reflect light an even number of times. An image on the image plane of the imaging device 12 is an erect image.

Figure 2:
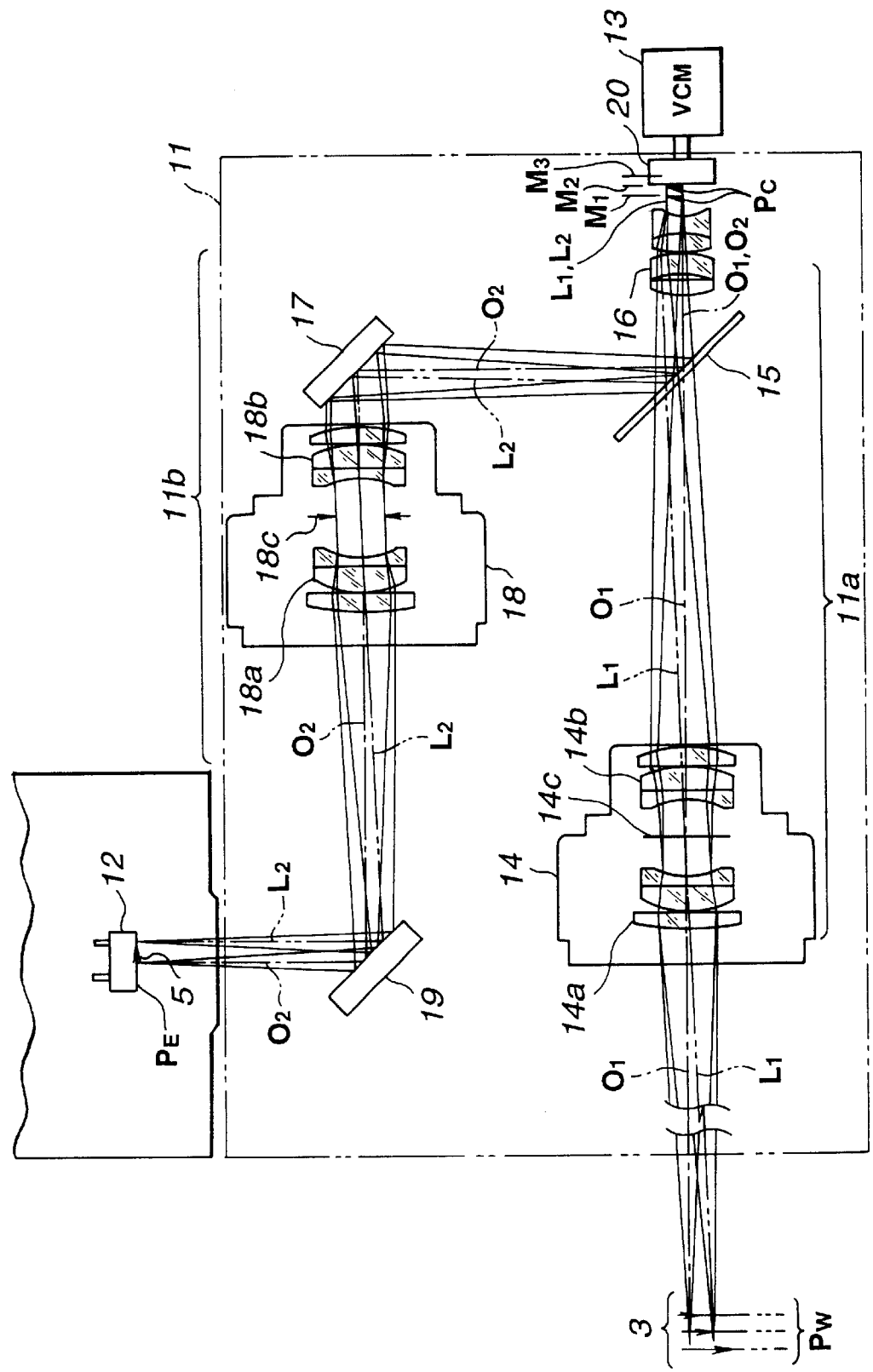
FIG. 2 is a diagram showing optical paths in an imaging optical system adapted to the image taking apparatus shown in FIG. 1.
Figure 3:
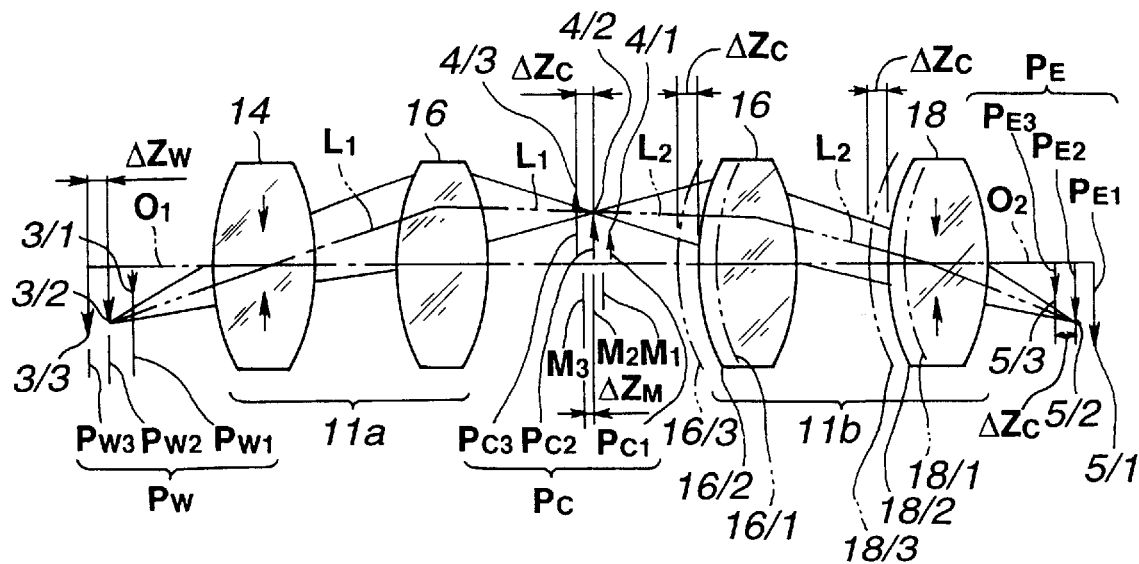
FIG. 3 is a diagram equivalent to the diagram of FIG. 2 showing the components developed with mirrors removed.

As shown in FIG. 3 which is equivalent to FIG. 2 showing optical paths and in which the components are shown with the mirrors removed, the first optical system 11a is a telecentric system in which primary light L1 from object light propagates through the center of the aperture stop 14c parallel to the optical axis $0_1$. The exit pupil of the first optical system 11a is equivalent to an image on an intermediate image plane $P_c$ and exists to infinity. The second optical system 11b is also a telecentric system in which primary light $L_2$ of intermediate image light or light depicting an intermediate image which passes through the center of the diaphragm 18c is also parallel to the optical axis $0_1$. In short, the optical systems 11a and 11b are telecentric systems whose exit and entrance pupils equivalent to the image on the intermediate image plane exist to infinity.

Object light reflecting from any of a plurality of object planes $P_w$ defined in the vicinity of the object 3 to be imaged is refracted or transmitted by the first optical system 11a having the optical axis $0_1$. The light from optical system 11a is converged on the intermediate image plane $P_c$, which is coincident with or adjacent to the reflecting surface of the movable mirror 20 and conjugate to the object planes $P_w$. An intermediate image 4 is formed at intermediate image plane $P_c$.

Light depicting the intermediate image or light heading for the intermediate image plane $P_c$ is reflected by the movable mirror 20, which is driven to vibrate in a direction $D_o$, in the direction of the optical axis $0_1$. The light is propagated along an optical axis $0_2$, refracted or reflected by the second optical system 11b, and is converged as a final image 5 on the imaging surface $P_E$ of the imaging device 12. Imaging device 12 includes a final image plane conjugate to the intermediate image plane $P_c$.

The positions of the object planes and the positions of the lenses and image planes which are to be changed with a displacement of the movable mirror 20 are indicated with subscripts 1 to 3 in FIG. 3. Image formation or the like will be described in conjunction with the positions of the movable mirror 20.

When the movable mirror 20 is located at a reference position $M_2$, an intermediate image 4/2 of an image contained in the object plane $P_{W2}$ is formed on the intermediate image plane $P_{C2}$ by the first optical system 11a, and its final image 5/2 is formed on the imaging surface $P_{E2}$ by the second optical system 11b.

When the movable mirror 20 is shifted toward the field lens 16 and reaches a position $M_3$, this is equivalent to a state in which the field lens 16 and second image formation lens frame 18 included in the second optical system 116 are moved to left-hand positions 16/3 and 18/3 respectively. In this state, the imaging surface of the imaging device 12 is moved to a left-hand position $P_{E3}$ and serves as an imaging surface $P_{E3}$. An intermediate image 4/3 of an image contained in the object plane $P_{W3}$ on the left-hand side of the object plane $P_{W2}$ is formed on the intermediate image plane $P_{C3}$, and its final image 5/3 is formed on the imaging surface $P_{E3}$.

When the movable mirror 20 is shifted away from the field lens 16 and reaches a position $M_1$, this is equivalent to a state in which the field lens 16 and second image formation lens frame 18 included in the second optical system 116 are moved to right-hand positions 16/1 and 18/1 respectively. In this state, the imaging surface of the imaging device 12 is moved to a position $P_{E1}$ and serves as an imaging surface $P_{E1}$. An intermediate image 4/1 of an image contained in the object plane $P_{W1}$ on the right-hand side of the object plane $P_{W2}$ is formed on the intermediate image plane $P_{C1}$, and its final image 5/1 is formed on the imaging surface $P_{E1}$.

As mentioned above, according to this embodiment, moving the movable mirror 20 alone is equivalent to the movement of both the second optical system 11b and imaging device 12. The focal point of the optical system can thus be shifted.

Assuming that the first optical system 11a is a reduction optical system, an especially favorable characteristic can be produced. The reason will be described below.

In the below description, movable mirror 20 has been moved from the position $M_2$ to the position $M_3$. Assuming that a magnitude of movement from the position $M_2$ to the position $M_3$ is $\Delta Z_M$, a magnitude of movement $\Delta Z_C$ is made by the field lens 16 included in the second optical system 116 and by the intermediate image plane $P_C$ and is equal to a change in the optical path length caused by moving the movable mirror 20 by the magnitude of movement $\Delta Z_M$. That is to say, $$\Delta Z_C = 2 \cdot \Delta Z_M \quad (1)$$

Assuming that a magnitude of movement from the object plane $P_{W2}$ to $P_{W3}$ is $\Delta Z_W$, the magnitude of movement $\Delta Z_C$ has the following relationship with a lateral magnification $\beta_a$ in the first optical system 11a:

$$\Delta Z_C = \beta^2 a \cdot \Delta Z_W \quad (2)$$

The expression below is derived from the expressions (1) and (2).

$$\Delta Z_W = 2 \cdot \Delta Z_M / (\beta a)^2 \quad (3)$$

The expression (3) indicates that when the lateral magnification $\beta_a$ is smaller, that is, when the reduction ratio produced by the first optical system 11 is smaller, even if a movement made by the movable mirror 20 is minute, a movement made by the object plane $P_W$ is larger. The above expressions have been described with respect to the object planes $P_{W2}$ and $P_{W3}$. Needless to say, the same equations apply to the object planes $P_{W2}$ and $P_{W1}$.

For example, when the lateral magnification $\beta_a$ of the first optical system 11a is 0.5, and the magnitude of movement $\Delta Z_M$ is 1 mm, the magnitude of movement of an object plane, $\Delta Z_W$, is 8 mm. In other words, when the movable mirror 20 is moved only by $\pm 1$ mm, the object plane $P_W$ moves in the range of $\pm 8$ mm. Needless to say, this characteristic helps reduce a load to be incurred by the movable mirror driving system.

For an image taking apparatus requiring an enlarged image as the final image 5, the power of the second optical system 11b is increased. That is to say, the first and second optical systems 11a and 11b are designed to form an enlargement optical system as a whole.

Figure 4:
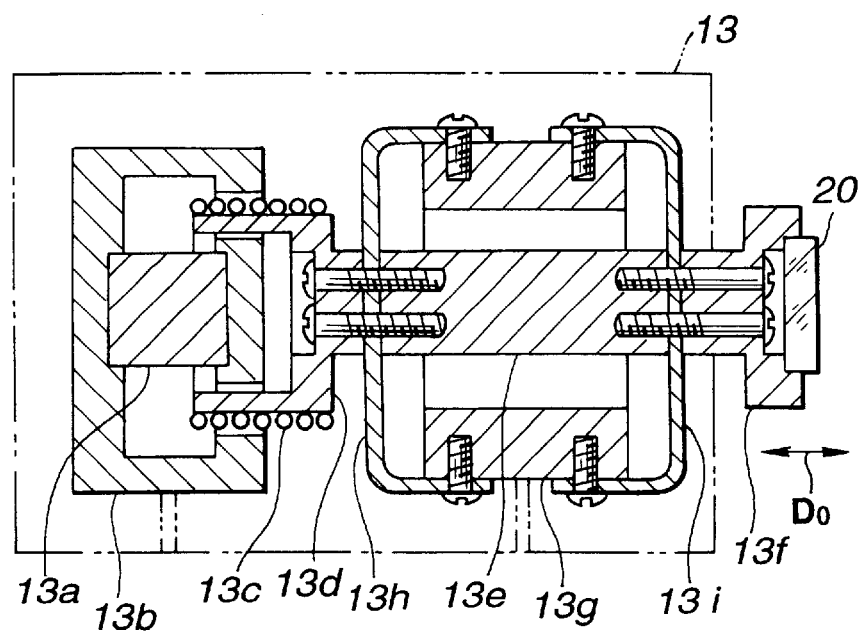
FIG. 4 is a sectional view of a major portion of a voice coil motor (VCM) adapted to the image taking apparatus shown in FIG. 1.

FIG. 4 is a sectional view showing a major portion of the structure of the VCM 13. As illustrated, the VCM 13 consists mainly of a yoke 13b having a permanent magnet 13a fixed to a motor body, a movable bobbin 13d about which a coil 13c is wound, a support 13e secured to the movable bobbin 13d, parallel blade springs 13h and 13i coupled with the movable bobbin 13d and having the center parts thereof supported by the support 13e, spring end supports 13g secured to the motor body and used to fix and support the ends of the parallel blade springs 13h and 13i, and a mirror support 13f fixed to the center of one of the parallel blade springs, that is, the parallel blade spring 13i.

When an AC driving voltage Vc is supplied from the VCM driver 25 (see FIG. 1) to the coil 13c, the movable bobbin 13d is driven to vibrate in a direction $D_o$. The frequency of vibrations induced by the VCM 13 is, for example, 30 Hz because image data for one screen is output at intervals of a half cycle $T_c/2$ (See FIG. 6) and the field rate of a video signal conformable to the NTSC system and output to the monitor 4 is 60 Hz. If output signal to monitor 4 is a signal conformable to a non-interlacing system, the frequency of vibrations induced by the VCM 13 is determined with respect to a frame rate. For example, when the frame rate of the non-interlacing system is 60 Hz, the frequency of vibrations induced by the VCM is 30 Hz.

A high-speed imaging device capable of coping with a frame rate at which images for a given number of screens can be read quickly during a half cycle $T_C/2$ of the vibration induced by the VCM must be adopted as the imaging device 12.

The amplitude $B_C$ of vibrations induced by the VCM 13 (See FIG. 6) should be set to a value allowing an intermediate image 4 on any of the plurality of intermediate image planes $P_C$, which are conjugate to the plurality of object planes $P_W$ defined on the object 3 shown in FIG. 2, to be formed on the imaging surface PE of the imaging device 12. Imaging surface $P_E$ that is the final image plane when the movable mirror 20 is moved by a magnitude corresponding to the amplitude $B_C$.

To be more specific, as shown in FIG. 3, for example, when a plurality of object planes $P_W$ defined on the object 3 are object planes $P_{W1}$, $P_{W2}$, and $P_{W3}$ and the intermediate image 4 are formed on any of a plurality of intermediate image planes $P_{C1}$, $P_{C2}$, and $P_{C3}$ via the first optical system 11a, the conditions described below must be satisfied.

Specifically, when the movable mirror 20 is located at a reference position $M_2$, that is, when the movable mirror is vibrated by a magnitude corresponding to half of the amplitude $B_c$, the intermediate image 4 on the center intermediate image plane $P_{C2}$ is formed as a final image 5 on the imaging surface $P_{E2}$ of the imaging device 12, by means of the second optical system 11b. Furthermore, when the movable mirror 20 is located at the position $M_1$ or $M_3$ within a range corresponding to the amplitude $B_c$, the intermediate image 4 on the intermediate image plane $P_{C1}$ or $P_{C3}$ must be formed as the final image 5 on the imaging surface $P_{E1}$ or $P_{E3}$ of the imaging device 12 by means of the second optical system 11b.

As mentioned above, for imaging an object having the plurality of object planes $P_{W1}$, $P_{W2}$, and $P_{W3}$ defined thereon, when the movable mirror 20 is vibrated with the reference position $M_2$ as a center, the amplitude $B_c$ of vibrations induced by the VCM 13 must be large enough to correspond to a range containing at least the positions $M_1$ and $M_3$.

Imaging carried out by the image taking apparatus of this embodiment having the foregoing components will be described in conjunction with FIGS. 1 to 3 as well as FIGS. 5 to 11.

Figure 5:
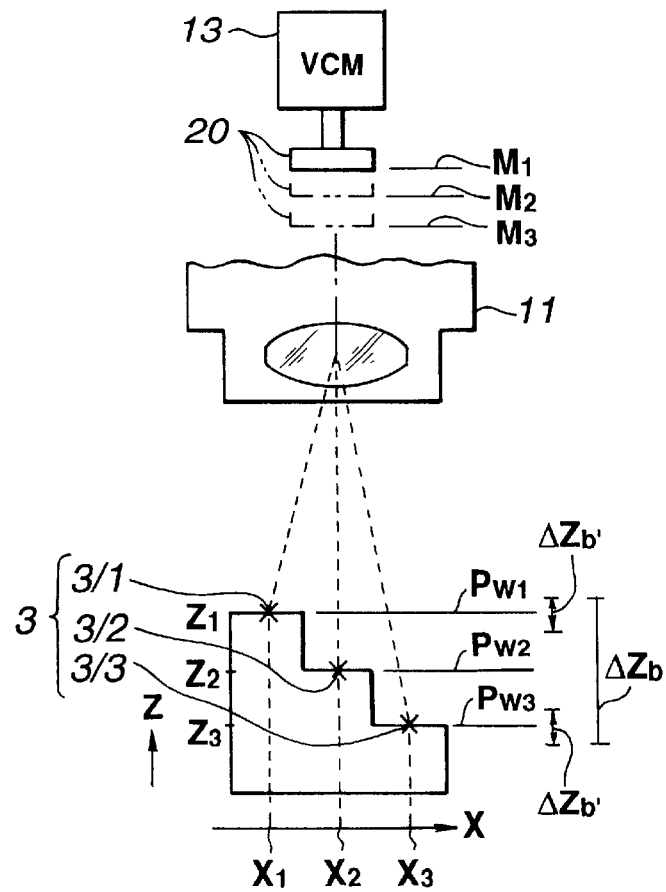
FIG. 5 is a diagram showing the relationship among an object, the imaging optical system, and a movable mirror in the image taking apparatus shown in FIG. 1.
Figure 6:
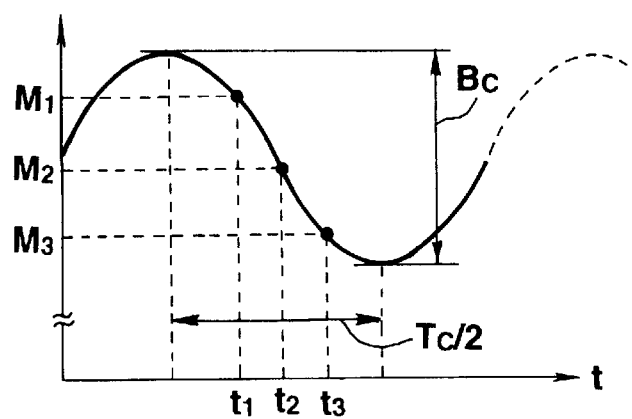
FIG. 6 is a diagram showing a wave representing a vibration made by a movable mirror adapted to the image taking apparatus shown in FIG. 1.
Figure 7:
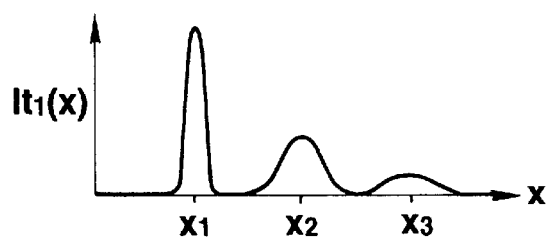
FIG. 7 is a diagram showing a distribution of illuminance levels at three points along the x axis of the object which are indicated by an object image produced by the image taking apparatus shown in FIG. 1 at a certain elapsed time instant.
Figure 8:
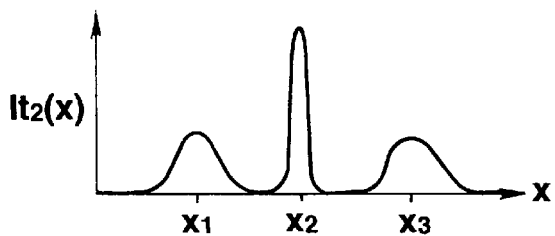
FIG. 8 is a diagram showing a distribution of illuminance levels at the three points along the x axis of the object which are indicated by an object image produced by the image taking apparatus shown in FIG. 1 at a subsequent elapsed time instant.
Figure 9:
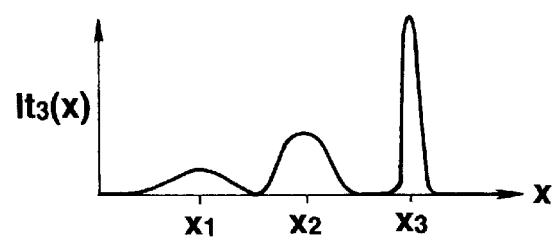
FIG. 9 is a diagram showing a distribution of illuminance levels at the three points along the x axis of the object which are indicated by an object image produced by the image taking apparatus shown in FIG. 1 at a subsequent elapsed time instant.
Figure 10:
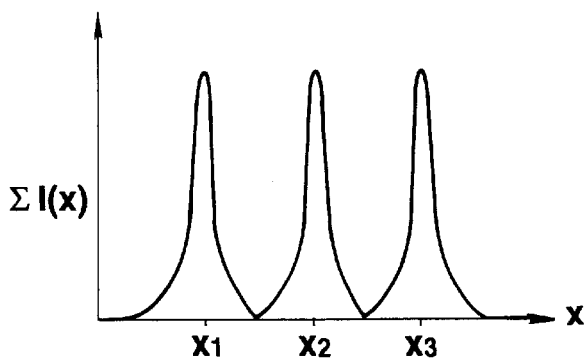
FIG. 10 is a diagram showing data calculated by adding up the distributed illuminance levels indicated by the object images shown in FIGS. 7, 8, and 9.
Figure 11:
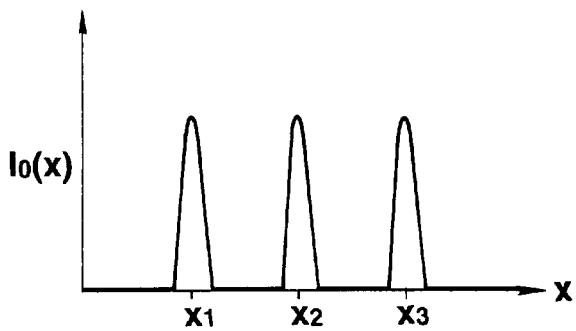
FIG. 11 is a diagram showing a distribution of intensities of light expressing object image data produced by restoring additive data shown in FIG. 10.

FIG. 5 is a diagram showing the relationship among the object 3, imaging optical system 11, and movable mirror 20. FIG. 6 is a diagram showing a wave representing a vibration made by the movable mirror 20. FIGS. 7 to 9 are diagrams showing distributions of luminance levels at three points along the x axis orthogonal to the z axis of the object which are indicated by object 3 images acquired at elapsed time instants. FIG. 10 is a diagram showing data produced by adding up the amounts of light indicated by the object images graphically shown in FIGS. 7 to 9. FIG. 11 is a diagram showing a distribution of intensities indicated by object image data that is produced by restoring the additive data graphically shown in FIG. 10.

In processing of image data to be described below, image data is processed in relation to the imaging surface of the imaging device located on a plane orthogonal to the z axis of the object coincident with the optical axis $0_1$. The description of a practical example will proceed on the assumption that data is processed in relation to the x axis alone which is orthogonal to the z axis.

In the image taking apparatus of this embodiment, a plurality of object planes $P_W$ are defined in the vicinity of the object 3 to be imaged. For example, as shown in FIG. 3, the planes $P_{W1}$, $P_{W2}$ (center), and $P_{W3}$ are defined as the object planes.

Objects 3/1, 3/2, and 3/3 that are point sources on the object planes $P_{W1}$, $P_{W2}$, and $P_{W3}$ are, as shown in FIG. 5, are regarded as parts of the object 3. A wave representing a vibration made by the movable mirror 20 is a sine wave as shown in FIG. 6. The reference position $M_2$ and positions $M_1$ and $M_3$ to which the movable mirror 20 is moved shall be defined within a range corresponding to the maximum amplitude $B_c$ of the sine wave. In imaging states to be described below, the positions $M_1$, $M_2$, and $M_3$ are positions to which the movable mirror 20 is driven in order to produce final images 5 of the subjects 3/1, 3/2, and 3/3 which are in focus.

Prior to the imaging of object 3, when the movable mirror 20 is located at the reference position $M_2$, the position of the first image formation lens frame 14 is adjusted so that the image of the subject 3/2 on the center object plane $P_{W2}$ is formed on the imaging surface $P_E$ of the imaging device 12.

After the adjustment is completed, the VCM 13 is driven in order to vibrate the movable mirror 20. Within a half cycle $T_c/2$ of a vibration, at elapsed time instants $t_1$, $t_2$, and $t_3$ (see FIG. 6) at which the movable mirror 20 is located at the positions $M_1$, $M_2$, and $M_3$ respectively, an image signal output from the imaging device 12 is fetched into the image signal processing circuit 22 (see FIG. 1). The graphs of FIGS. 7 to 9 indicate changes in illuminance $It_1(x)$, $It_2(x)$, and $It_3(x)$, which are calculated on the basis of charges accumulated in the imaging device 12 per unit light-receiving area during a given charge accumulation time, occurring at three points on the x axis of the subject at the elapsed time instants $t_1$, $t_2$, and $t_3$. For example, at the elapsed time instant $t_1$, since the movable mirror 20 is located at the position $M_1$, the distribution of illuminance levels $It_1(x)$ (FIG. 7) indicating that only the object 3/1 on the object plane $P_{W1}$ is focused and the other objects 3/2 and 3/3 are not focused is observed on the imaging surface PE of the imaging device 12. Likewise, when the movable mirror 20 is moved to the position $M_2$ or $M_3$ at the elapsed time instant $t_2$ or $t_3$, the distribution of illuminance levels $It_2(x)$ or $It_3(x)$ (FIG. 8 or 9) indicate that the object 3/2 or 3/3 alone is focused is observed.

Image data items indicating changes in illuminance $It_1(x)$, $It_2(x)$, and $It_3(x)$ occurring at the elapsed time instants $t_1$, $t_2$, and $t_3$ respectively are output to the addition circuit 23. Thus, amounts of light at each of the three points on the x axis are added up. This results in image data that is additive data $\Sigma I(x)$ expressed as a distribution of illuminance levels shown in FIG. 10. The additive data $\Sigma I(x)$ expressed as the distribution of illuminance levels contains data indicating spatial frequencies or low-frequency components of object image signals representing object images that are out of focus. In order to remove the components representing the object images that are out of focus and extracting image data representing object images that are in focus, the restoration circuit 24 carries out restoration by filtering spatial frequencies. FIG. 11 is a graph showing a distribution of intensities of light $I_0(x)$ indicated by image data resulting from the restoration. As seen from FIG. 11, image signals representing images of the objects 3/1, 3/2, and 3/3 on the object planes $P_W$ shown in FIG. 5 which are in focus and realize a large depth of field are produced.

Addition performed by the addition circuit 23 and restoration performed by the restoration circuit 24 will be described later in conjunction with FIGS. 15 to 21.

As mentioned above, according to the image taking apparatus of this embodiment, even when an imaging optical system suffering from a small depth of field is employed, object planes containing object images to be formed on the imaging surface of an imaging device can be changed merely by driving the movable mirror 20 located in the vicinity of an intermediate image plane so as to vibrate it without the necessity of driving a lens. Object images for realizing a large depth of field can thus be acquired.

For example, as shown in FIG. 5, when the movable mirror 20 is not vibrated, even if the depth of field offered by the imaging optical system 11 is a small depth of field $\Delta Z_b'$, the movable mirror 20 can be vibrated in order to acquire image signals. When the aforesaid image processing is carried out, image data proving a large depth of field $\Delta Z_b$ can be acquired. In the above description, images produced by focusing the optical system only on the objects 3/1, 3/2, and 3/3 are added up. More preferably, images of objects located in a wider area in the z direction should be added up. Moreover, strictly speaking, the images of the objects 3/1 and 3/3 expressed in the distribution $\Sigma I(x)$ in FIG. 10 have a slightly larger dimmed portion than the image of the object 3/2. The images of the objects 3/1 and 3/3 expressed in the distribution $I0(x)$ in FIG. 11 are still slightly dimmed. However, the degree of the dim is negligible in practice. The same applies to the third embodiment to be described later.

The apparatus of this embodiment is designed so that only the movable mirror 20 having a small mass is driven to vibrate in order to shift the focus of the imaging optical system at which an object image is in focus, but the position of the whole imaging optical system is not shifted. The frequency of vibrations can be raised to, for example, about 30 Hz, and restored images can be displayed in real time. Furthermore, the VCM 13 that is an actuator for driving the optical system can be designed compactly.

The reference position of the movable mirror 20 is a position on the intermediate image plane. This makes it possible to minimize an increase in the degree of an aberration caused by the field lens 16 as the result of focus shifts made by moving the mirror 20. Moreover, since the effective reflecting surface of the movable mirror 20 can be made small, the mass of a load to be driven by the VCM 13 gets smaller.

In the apparatus of this embodiment, since the half mirror 15 is included in the optical system, the first optical system and second optical system can share the field lens 16. Furthermore, since the movable mirror 20 can be placed on the first optical axis $0_1$, the whole apparatus can be designed to be inexpensive and compact.

Moreover, the apparatus of this embodiment adopts the optical System including the second optical system 11b that is a telecentric system whose entrance pupil, equivalent to an image on the intermediate image plane exists to infinity. It is thus prevented that the magnification of an image changes due to a change in the degree at which the image is in focus.

However, both the first optical system 11a and second optical system 11b need not be telecentric systems whose exit and entrance pupils, equivalent to an image on the intermediate image plane, exist to infinity. As long as one of the optical systems 11a or 11b is a telecentric system, the foregoing change in magnification of an image can be suppressed. Even an image taking apparatus adopting an imaging optical system having the first optical system 11a and second optical system 11b either of which is a telecentric system can acquire object images which realize as large a depth of field as that offered by the image taking apparatus of the first embodiment.

However, the diaphragm included in an optical system that is not a telecentric system must have a sufficiently large diameter so as not to vignette light passing through a telecentric system. Moreover, when the first optical system is not a telecentric system and the second optical system is a telecentric system, the first optical system alone should be moved for zooming but the entire imaging device need not be moved. Incidentally, the first optical system may be a telecentric system and the second optical system may not be a telecentric system. For raising the power of the optical system so as to produce an enlarged image, it is practical to employ an objective lens designed for a microscope in the first optical system. The objective lens designed for a microscope includes an aperture stop. The aperture stop is positioned properly so that the first optical system will function as a telecentric system. The fourth and fifth embodiments to be described later are embodiments in which the employment of the objective lens designed for a microscope will prove effective.

An actuator serving as a mirror driving means is not limited to the VCM 13 employed in the aforesaid embodiment. An actuator using a piezoelectric device as a bimorph cell or a stepping motor can be employed. Moreover, the movable mirror 20 may not be driven to vibrate but may be driven unidirectionally. Even when the movable mirror 20 is driven unidirectionally, it is possible to acquire object images of objects contained in a plurality of object planes. In this case, a solenoid or the like may be used as the actuator. This results in an inexpensive image taking apparatus.

Moreover, the reference position of the movable mirror 20 need not coincide with a position on the intermediate image plane located between the first optical system 11a and second optical system 11b. As long as an increase in the degree of an aberration is negligible for practical use, the reference position of the mirror 20 may be any position between the first and second optical systems. However, when the movable mirror 20 is located at any of the reference position and positions to which the mirror is moved while vibrating, a plurality of object planes of the three-dimensional object 3 which are determined at the time of imaging must be conjugate to the image plane $P_E$ of the imaging device 12.

In the image taking apparatus of this embodiment, a position to which the movable mirror is vibrated is not particularly detected using a position sensor. The movable mirror is driven to vibrate under various pre-set conditions for driving, and imaging is carried out. However, when the reference position $M_2$ of the movable mirror 20 or the amplitude $B_c$ of a vibration thereof may be varied depending on the posture or the like of the camera head 1, a sensor for detecting the position of the camera head or detecting the position of the movable mirror 20 must be included in order to detect or predict a position to which the movable mirror is actually driven to vibrate, and imaging must be carried out on the basis of the result of detection or prediction.

A pellicle mirror or beam splitter may be substituted for the half mirror 15 employed in the image taking apparatus of the aforesaid embodiment. The pellicle mirror should be made of a pellicle whose thickness is equal to or smaller than 5 micrometers. Using this pellicle mirror, a ghost image or an astigmatism hardly occur.

Next, an image taking apparatus in accordance with the second embodiment of the present invention will be described.

Figure 12:
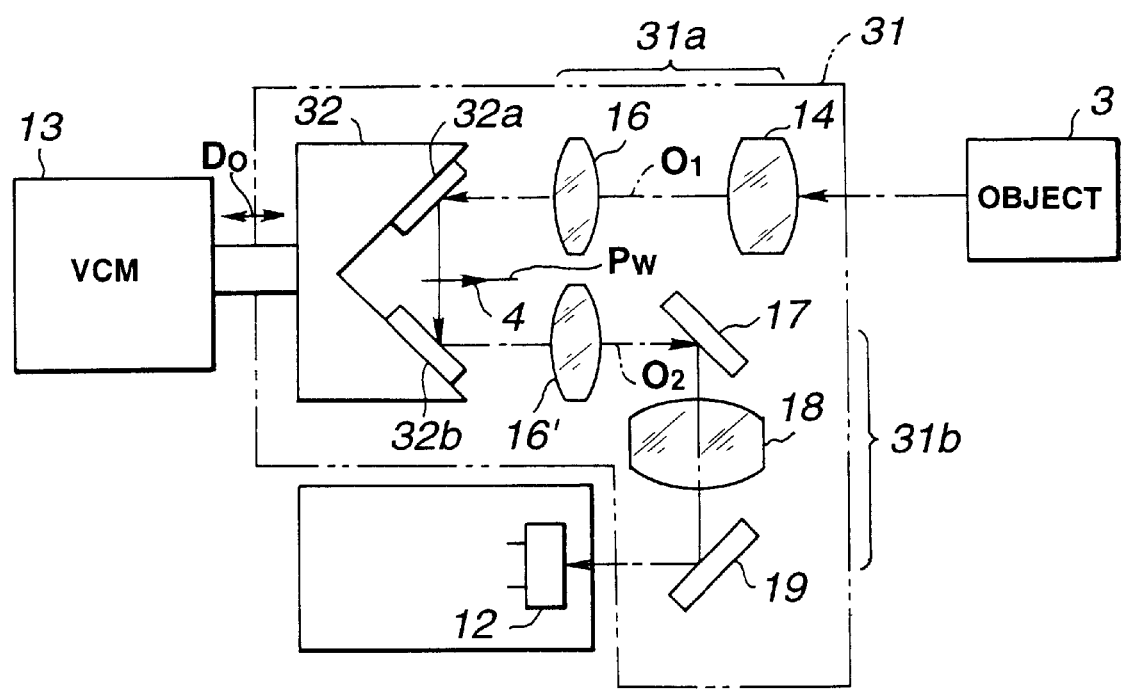
FIG. 12 is a diagram showing the configuration of an imaging optical system adapted to an image taking apparatus in accordance with the second embodiment of the present invention.

As shown in FIG. 12, the image taking apparatus of this embodiment includes an imaging optical system 31 in place of the imaging optical system 11 employed in the apparatus of the first embodiment. The imaging optical system 31 is an optical system using a movable roof mirror 32 as the movable mirror. In this case, the half mirror 15 of the first embodiment becomes unnecessary, and accordingly, a loss in amount of light can be reduced. The CCU 2, VCM 13, and other control units have the same configurations as those in the first embodiment shown in FIG. 1.

The imaging optical system 31 consists mainly of, as shown in FIG. 12, a first optical system 31a for acquiring object light, a movable roof mirror 32 to be driven to vibrate by means of the VCM 13 and thus make a parallel movement sequentially, and a second optical system 31b for forming an object image on the imaging device 12.

The first optical system 31a includes, like the one in the first embodiment, an image formation lens 14 having an aperture stop that is kept open, and a field lens 16. The optical axis of the first optical system shall be an optical axis $0_1$. The second optical system 31b includes, like the one in the frist embodiment, an image formation lens 18 whose diaphragm is adjustable, a field lens 16', and two plane mirrors 17 and 19. The optical axis of the second optical system shall be an optical axis $0_2$. An intermediate image is formed between the field lens 16 and field lens 16'. Both the first optical system 31a and second optical system 31b are telecentric systems whose exit and entrance pupils, equivalent to an image on the intermediate image plane exist to infinity. Alternatively, the second optical system 31b alone may be a telecentric system.

The movable roof mirror 32 is a roof mirror having two reflecting surfaces 32a and 32b and driven to vibrate by means of the VCM 13. At each position to which the movable roof mirror 32 is driven, the movable roof mirror 32 reflects light propagating along the optical axis $0_1$ of the first optical system 31a in the direction of the optical axis $0_2$ of the second optical system 31b. Herein, a direction in which the movable roof mirror 32 is vibrated is parallel to the optical axes $0_1$ and $0_2$.

In the image taking apparatus of this embodiment using the imaging optical system 31, like the apparatus of the first embodiment, the movable roof mirror 32 is driven to vibrate. A plurality of object images, which are contained in a plurality of object planes defined in the vicinity of the object 3 and are in focus, are added up and then restored. Consequently, an object image providing a large depth of field can be acquired.

According to the apparatus of this embodiment, since the movable roof mirror 32 is used as the movable mirror, the half mirror 15 becomes unnecessary. A loss in amount of light can therefore be reduced, and a bright image can be acquired.

Next, an image taking apparatus in accordance with the first variant of the first embodiment will be described. In the image taking apparatus of the first embodiment, a plurality of image data items acquired by driving the movable mirror to different positions are added up by the addition circuit, and then restored in order to produce image data providing a large depth of field. In this first variant, an image taking apparatus does not include the addition circuit, but rather carries out the addition using an imaging device, and can acquire image data providing a large depth of field.

Figure 13:
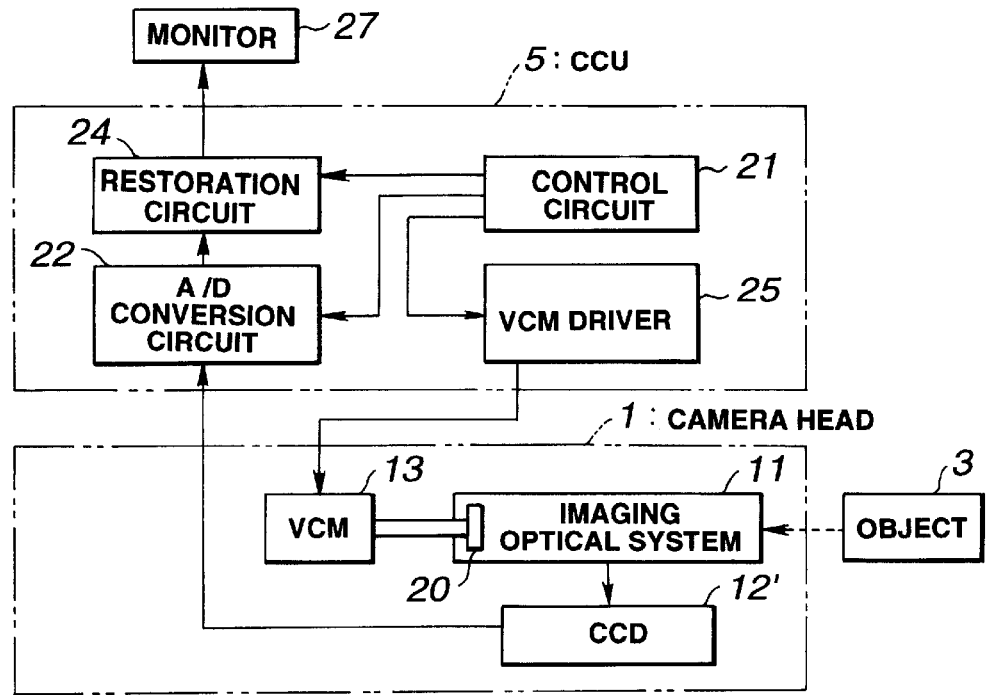
FIG. 13 is a block diagram showing an image taking apparatus in accordance with the first variant of the first embodiment.

FIG. 13 is a block diagram showing the configuration of the image taking apparatus of the first variant. The apparatus of the first variant, includes an A/D conversion circuit 22 for processing an image signal sent from a CCD 12' serving as an imaging device, which is included in a camera control unit (CCU) 5. The output of A/D circuit 22 is input directly to a restoration circuit 24 for the purpose of restoration. The other components illustrated in FIG. 13 are identical to those of the apparatus of the first embodiment shown in FIG. 1. The CCD 12' may be an imaging device of any other type, for example, a charge-modulated device (CMD).

The CCD 12' is an imaging device offering a normal frame rate and shall acquire image data of one field per 1/60 seconds. A vibration cycle or a cycle during which the movable mirror 20 makes a vibration is 1/30 seconds. The control circuit 21 controls a phase by which the VCM 13 drives the mirror 20 so that image data of one field produced by the CCD 12' can be acquired during a half of the cycle. Like the aforesaid embodiments, the movable mirror 20 is driven to vibrate so that the final image plane will coincide with the imaging surface of the CCD 12' in a state in which the intermediate image plane conjugate to the object planes defined in the vicinity of the object 3 is interposed between the first and second optical systems.

While the movable mirror 20 is driven to move, a charge is accumulated in each light-receiving element of the CCD 12' depending on which of the images contained in the object planes on the subject 3 is acquired. As a result, the charges are input as an additive image signal to the A/D conversion circuit 22. An image signal representing one field is output to the restoration circuit 24 via the A/D conversion circuit 22.

For example, assuming that the object 3 shown in FIG. 5 is imaged, while the movable mirror 20 is driven during a half cycle, the amounts of light illustrated in FIGS. 7 to 9 fall successively on the imaging surface of the CCD 12', and are then integrated (added up). In short, addition is carried out on the imaging surface of CCD 12'. When driving during the half cycle is completed, additive data is output from the A/D circuit 22 to the restoration circuit 24. This data contains a change in amount of light as shown in FIG. 10 and is output as an image signal representing an image composed of images that are in focus and out of focus. The data indicating the amount of light, which is illustrated in FIG. 10, is equivalent to that resulting from addition performed by the addition circuit 23 included in the apparatus of the first embodiment.

Thereafter, the restoration circuit 24 restores the image signal and converts it into a video signal conformable to the NTSC system or the like. Consequently, one image providing a large depth of field is produced in the same manner as that in the first embodiment.

According to the image taking apparatus of the first variant, the same advantage as that provided by the apparatus of the first embodiment can be provided. At the same time, the CCD 12' offering a normal frame rate can be used as an imaging device. Moreover, the necessity of the addition circuit is obviated. An inexpensive image taking apparatus can therefore be provided.

Needless to say, the imaging optical system 31 employed in the second embodiment can be adapted to the apparatus of this variant.

Next, an image taking apparatus in accordance with another variant or the second variant of the first embodiment will be described. The image taking apparatus of the first embodiment requires the addition circuit 23 and restoration circuit 24. Alternatively, an image taking apparatus that requires neither the addition circuit 23 nor restoration circuit 24 can be constructed according to this second variant.

Figure 14:
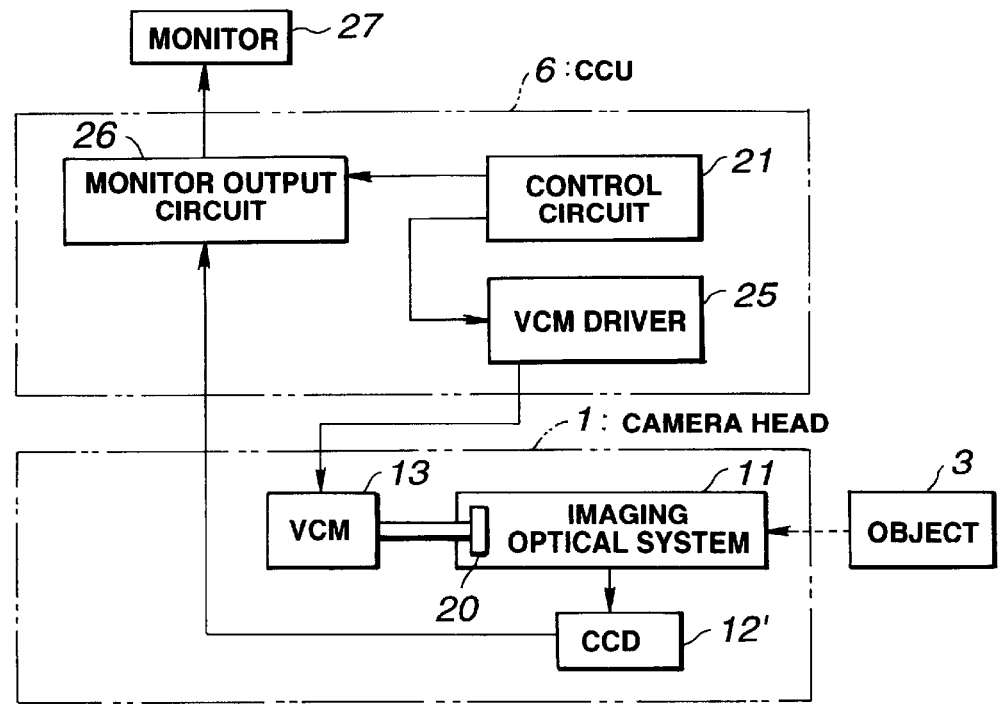
FIG. 14 is a block diagram showing an image taking apparatus in accordance with the second variant of the first embodiment.

FIG. 14 is a block diagram showing the image taking apparatus of the second variant. In the apparatus of the second variant, a camera control unit 6 includes neither an addition circuit nor a restoration circuit. An image signal produced by a CCD 12' serving as an imaging device is converted into a video signal conformable to the NTSC system by means of a monitor output circuit 26, and output directly to a monitor 27. The other components are identical to those of the apparatus of the first embodiment shown in FIG. 1.

The CCD 12' is an imaging device offering a normal frame rate like the one in the first variant, and acquires image data of, for example, one field per 1/60 seconds. A vibration cycle or a cycle of a vibration made by the movable mirror 20 is 1/30 seconds like that in the first variant. A phase by which the VCM 13 drives the movable mirror is controlled by the control circuit 21 so that data of one field can be acquired by the CCD 12' during a half of the cycle. Positions to which the movable mirror 20 is driven to vibrate according to object planes on the object 3 shall be the same as those in the first variant.

While the movable mirror 20 is being driven, a charge is accumulated in each light-receiving element of the CCD 12' depending on which of the images contained in the object planes on the object 3 is acquired. Accumulated charges are then integrated (added up) and output as an additive image signal for one screen to the monitor output circuit 26. The additive image signal is then converted into, for example, a video signal conformable to the NTSC system, and then output to the monitor 27.

As mentioned above, a screen produced by integrating or adding up image signals produced by moving the movable mirror 20 is displayed periodically on the monitor 27. Since a human being perceives and afterimage, he/she can observe and image providing a large depth of field.

According to the image taking apparatus of this second variant, since neither addition nor restoration is needed, an inexpensive and compact image taking apparatus capable of offering a large depth of field can be realized. However, in this variant, since restoration is not carried out, removal of a low-frequency component is omitted. Compared with an image having undergone restoration, an image generated by an apparatus of this second variant is slightly flared.

Needless to say, the imaging optical system 31 employed in the second embodiment can be adapted to the apparatus of the second variant.

Next, the operations of an addition circuit and restoration circuit employed in the image taking apparatus of the first embodiment and in the image taking apparatuses of the variants will be described.

The operations which are described in relation to an image taking apparatus disclosed in the Japanese Examined Patent Publication No. 1-309478 will be described in conjunction with the drawings.

Figure 15:
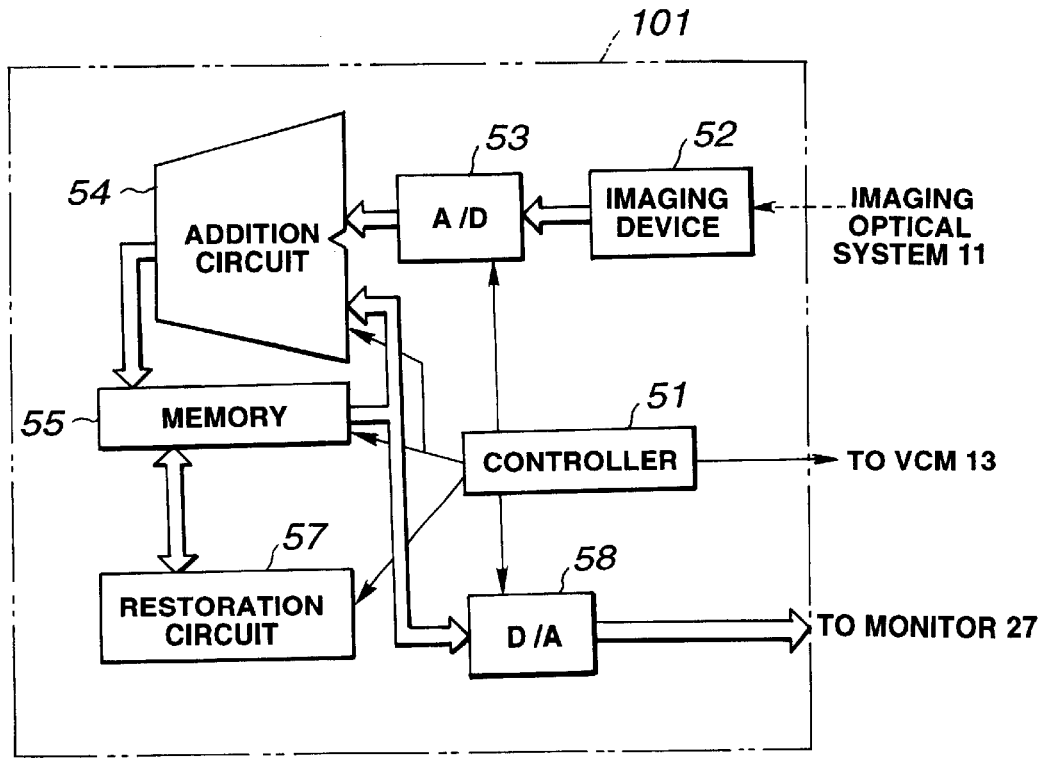
FIG. 15 is a block diagram showing an example of a CCU in which an addition circuit and restoration circuit are incorporated and which is adaptable to the apparatus of the first embodiment.

FIG. 15 is a block diagram showing the configuration of a camera control unit (CCU) 101 which includes an addition circuit 54 and a restoration circuit 57 that can be employed in the first embodiment and which includes an imaging device 52.

In the CCU 101, an image of a subject is formed on the imaging surface of the imaging device 52 formed with a CCD or pickup by means of the imaging optical system 11 shown in FIG. 1.

An output signal of the imaging device 52 is converted into a digital signal by an analog-to-digital conversion circuit (hereinafter an A/D conversion circuit) 53. The digital signal is added to an image signal recorded in a memory 55 by means of an addition circuit 54. A result of addition is recorded in the memory 55 again.

The foregoing operation is repeated while the movable mirror 20 is moved by the VCM 13 shown in FIG. 1. Specifically, the operation is carried out while the focal point of the optical system is varied discretely in units of a properly-defined distance within a properly-defined range. Thus, input images are added up. A resultant image is then stored in the memory 55.

Next, the additive image data is subjected to proper restoration by means of a restoration circuit 57. For example, high-pass filtering or bandpass filtering is carried out relative to spatial frequencies. The result of restoration is stored in the memory 55.

A resultant image signal stored in the memory 55 and having undergone restoration is converted into an analog signal by a digital-to-analog conversion circuit (hereinafter a D/A conversion circuit) 58, and then displayed on the monitor 4 shown in FIG. 1. For the foregoing operations, timing and flow of signals are controlled by a controller 51.

Figure 16:
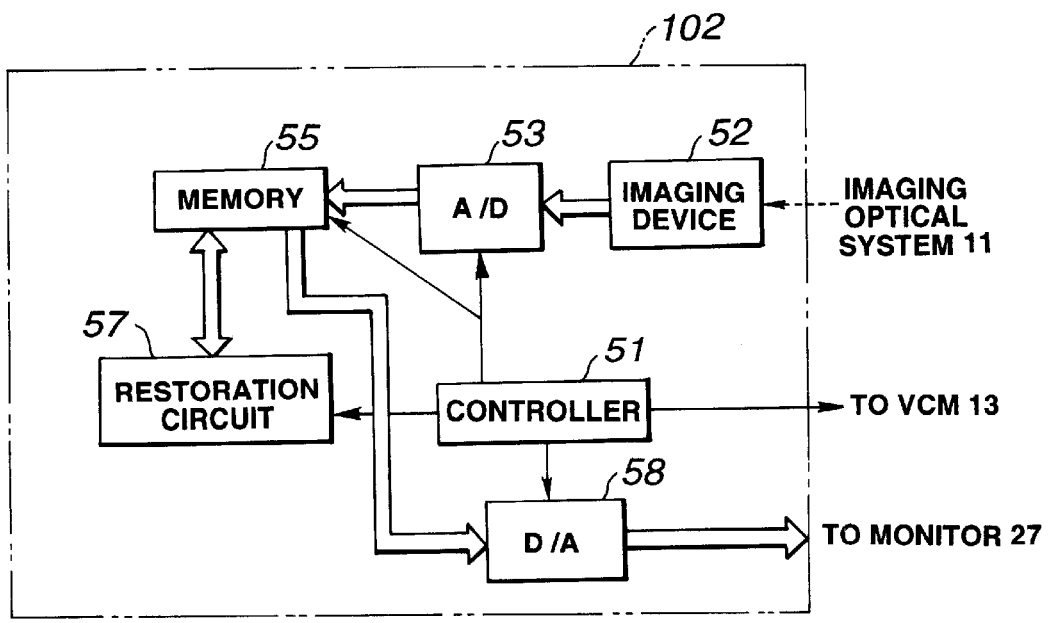
FIG. 16 is a block diagram showing an example of a CCU including a restoration circuit and adaptable to the first variant of the first embodiment.

FIG. 16 is a block diagram showing an example of a CCU 102 that includes a restoration circuit but does not include an addition circuit and is united with the imaging device 52.

In the CCU 102, image data accumulated in the imaging device 52 is converted into a digital signal by the A/D conversion circuit 53, and then stored in the memory 55. The image data is equivalent to image data resulting from addition performed by the CCU 101. Thereafter, the image data is subjected to proper filtering for restoration by means of the restoration circuit 57, and then stored in the memory 55 again.

The image data subjected to restoration and stored in the memory 55 is converted into an analog signal by the D/A conversion circuit 58, and displayed on the monitor 4. For the above operations, timing and data flow are controlled by the controller 51.

In the CCU 102 having the above configuration, imaging device 52 accumulates (integrates) optical energy. Images produced by continuously varying the focus of the optical system are input and accumulated at the same time. Consequently, the imaging device 52 itself inputs and adds up images simultaneously. This leads to a very simple configuration and high-speed processing. Moreover, since the focal point of the optical system should merely be varied continuously within a proper range, the focal point can be easily controlled.

Next, a practical example of the restoration circuit 57 employed in the CCU 101 or 102 will be described. The restoration circuit 57 is a circuit for performing high-pass filtering or bandpass filtering on spatial frequencies indicated by image data which is produced by adding up image data items acquired by setting the optical system to different focal points.

Figure 17:
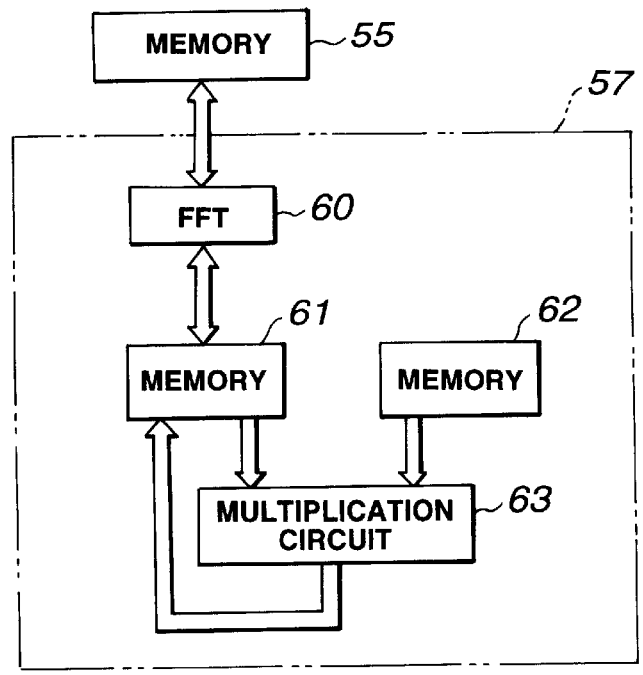
FIG. 17 is a block diagram showing one practical example of the restoration circuit shown in FIG. 15.

FIG. 17 is a block diagram showing the configuration of a practical example of the restoration circuit 57. In the restoration circuit 57, image data stored in the memory 55 is subjected to two-dimensional Fourier transform by means of a fast Fourier transform (FFT) circuit 60 incorporated in the restoration circuit 57. The resultant data is stored in a memory 61.

A filter coefficient designed properly in terms of spatial frequencies is stored in a memory 62. A spatial frequency spectrum indicated by an image stored in the memory 61 and the filter coefficient stored in the memory 62 are multiplied by a multiplication circuit 63. The result of multiplication is stored in the memory 61.

Image data which is recorded in the memory 61 and whose spatial frequencies are filtered is subjected to two-dimensional Fourier transform by the FFT circuit 60. The resultant data is stored in the memory 55.

According to the restoration circuit 57 having the foregoing components, a filter for handling spatial frequencies can be designed in any form.

Figure 18:
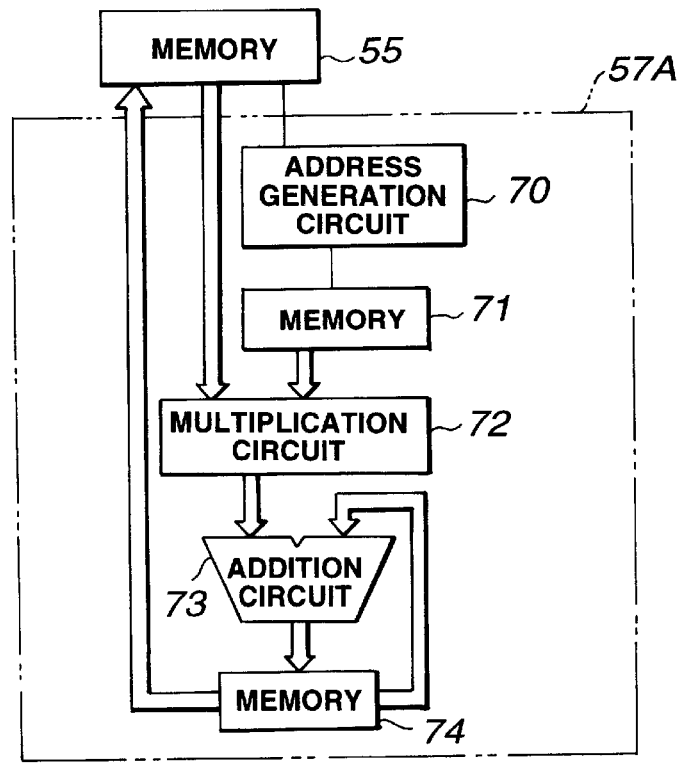
FIG. 18 is a block diagram showing another practical example of the restoration circuit shown in FIG. 15.

FIG. 18 is a block diagram showing a restoration circuit 57A as another practical example of a restoration circuit. In this example, image data is produced by adding up images acquired by setting the optical system to different focal points, and is stored in the memory 55. A pixel value in the image data specified by an address generation circuit 70 is input to a multiplication circuit 72.

A coefficient recorded in a memory 71 and specified by the address generation circuit 70 is also input to the multiplication circuit 72. The pixel value is then multiplied by the coefficient. The result of multiplication performed by the multiplication circuit 72 is added to a value recorded in a memory 74 by means of an addition circuit 73. The result of addition is recorded in the memory 74.

Owing to the above configuration, "convolution" is carried out for a local area of 3 by 3 pixels or 5 by 5 pixels within an image. The result of convolution is recorded in the memory 55.

In this example, filtering of spatial frequencies is not carried out, but rather, "convolution" is carried out employing a properly designed mask. Thus, restoration is achieved. Restoration can therefore be achieved using simple circuitry. An effective filter can be designed using a small mask, and the number of arithmetic operations diminishes. Alternatively, for masking an area of a screen, a pipelined processor may be used to carry out processing at a high speed.

Next, a method of designing a restoration filter for use in a restoration circuit will be described. The characteristic of an incoherent image formation optical system with respect to spatial frequencies is generally expressed by an optical transfer function (hereinafter an OTF) given by the autocorrelation function of a pupil function. Assuming that an aperture stop has a round opening, the OTF of a surface of a lens that is focused on an object is expressed by the autocorrelation function (5) based on the pupil function (4) as follows:

$$P(x, y) = P(r, \theta) = P(r) \quad (4)$$
$$= 1(\sqrt{x^2 + y^2} = r \leq a0)$$
$$0(\sqrt{x^2 + y^2} = r > a0)$$

$$H(u, v) = \left\{ \int_{-\infty}^{+\infty} \int_{-\infty}^{+\infty} P(x + \lambda fu/2, y + \lambda fv/2) \cdot \right. \quad (5)$$
$$\left. P(x - \lambda fu/2, y - \lambda fv/2) dxdy \right\} /$$
$$\int_{-\infty}^{+\infty} \int_{-\infty}^{+\infty} P(x, y) dxdy$$

where (x, y) are coordinates defining a point in the system of orthogonal coordinates expressing an exit pupil, (r, Θ) are cylindrical coordinates indicating a radius vector and angle respectively. Moreover, a0 denotes the size of an exit pupil, and that is, for example, equivalent to a radius of an aperture stop of a lens. Moreover, when the aperture stop is round, an angle does not count. The angle 0 is therefore omitted.

Next, an OTF causing an optical system to go out of focus is given by the autocorrelation function of a pupil function which is generally adopted as follows:

$$P(x, y) = P(r, \theta) \quad (6)$$
$$= P(r) \exp\{jkW(r; z)\}$$

where $k = 2\pi/\lambda$ is a wave number, and W(r;z) indicates a wavefront aberration and is expressed as a difference in an exit pupil between a wave surface W1 of light that is converged on a certain object plane and a wave surface W2 of light that is not converged thereon. z denotes a coordinate on the optical axis. The z coordinate of a focal point is 0. Using the z coordinate, it can be indicated how far away a certain point is from the focal point.

When the wave surface W1 can be readily fitted to the wave surface W2, the wavefront aberration W(r;z) is given as follows:

$$W(r;z) = r^2 \cdot z/(2 \cdot f^2) \quad (7)$$

When the aperture stop of a lens is large, the wavefront aberration W(r;z) is given as follows:

$$W(r;z) = r^2 \cdot z / \{2(f^2 + r^2)\} \quad (8)$$

where f is a focal length of the lens. The value f shall be larger than the value z.

Figure 19:
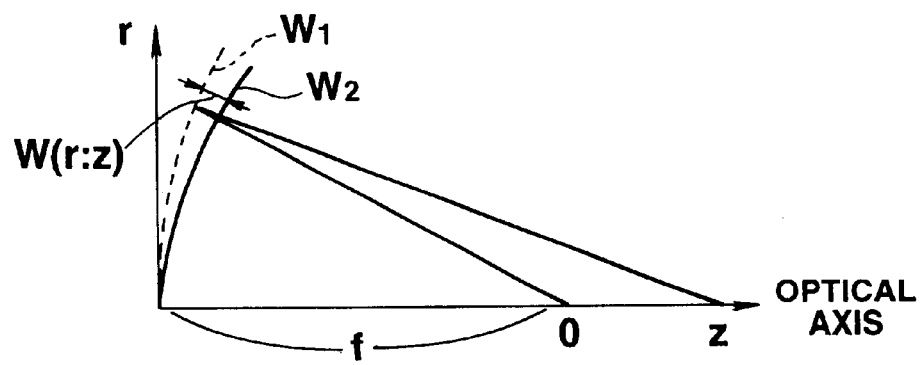
FIG. 19 is a diagram concerning a procedure of designing a restoration filter to be included in the restoration circuit shown in FIG. 15, and showing wave fronts in relation to distances along an optical axis.
Figure 20:
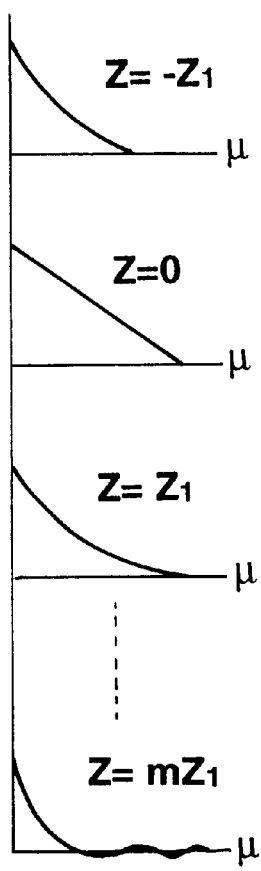
FIG. 20 is a diagram concerning a procedure of designing a restoration filter to be included in the restoration circuit shown in FIG. 15, and showing optical transfer functions (OTFs) in relation to spatial frequencies.

FIG. 19 is a diagram showing the geometrical relationship among the foregoing elements. Thus, an OTF characterizing an optical system that is not focused on a point z can be defined.

FIG. 20 and FIGS. 21A, 21B, and 21C are diagrams showing a procedure of designing a restoration filter on the basis of an OTF that is defined as mentioned above.

Figure 21A:
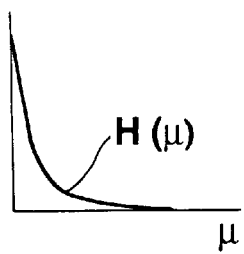
FIGS. 21A to 21C are diagrams concerning a procedure of designing a restoration filter to be included in the restoration circuit shown in FIG. 15.
Figure 21B:
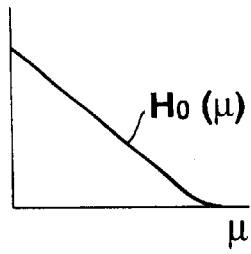

First, the value z is changed according to the conditions for setting. This results in OTFs shown in FIG. 20. These OTFs are then added up, whereby a synthetic OTF as shown in FIG. 21A is calculated. A restoration filter is then designed so that the additive synthetic OTF can be restored to an OTF characterizing an optical system that is focused on the point indicated by the value z shown in FIG. 21B. Assuming that the synthetic OTF is given as H(u, v)=H($\mu$, $\phi$)=H($\mu$) and the OTF characterizing an optical system that is brought into focus is $H_O(\mu)$, the restoration filter V($\mu$) is expressed as follows:

$$V(\mu) = HO(\mu)/H(\mu) \quad (9)$$

Figure 21C:
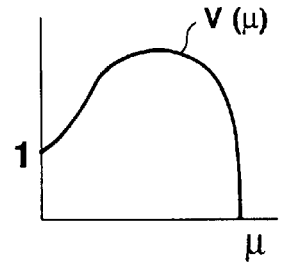

FIG. 21C shows a curve plotted to indicate values V($\mu$). Herein, (u, v) are coordinates indicating spatial frequencies in the system of orthogonal coordinates, and ($\mu$, $\phi$) are coordinates indicating spatial frequencies in the system of cylindrical coordinates. In the case of a round aperture stop, an angle does not count. A spatial frequency along a radius vector, $\mu$, alone is employed.

When an object can be specified to some extent, the statistical nature of the image of the object can be predicted, the nature of a noise is apparent, and a Wiener filter expressed below can be used as the restoration filter. That is to say, $$W(\mu) = \{HO(\mu) \cdot |H(\mu)|^2\} / [H(\mu)\{|H(\mu)|^2 + Snn(\mu)/Sgg(\mu)\}] \quad (10)$$

where Snn($\mu$) is a power spectrum of the noise, and Sgg($\mu$) is a power spectrum indicated by an image.

The employment of the Wiener filter permits minimization of the adverse effect of noise.

A filter defined by the expression below may be used as a pseudo Wiener filter.

$$W(\mu) = \{HO(\mu) \cdot |H(\mu)|^2\} / [H(\mu)\{|H(\mu)|^2 + P\}] \quad (11)$$

where a parameter P may be set to an appropriate value.

Next, a method of defining a restoration filter experimentally will be described. A test chart having a sufficiently flat surface is placed at a given position. The image of the test chart is input under preset conditions while the focus of an optical system is varied. The resultant input images are then added up.

Thereafter, an image acquired by focusing the optical system on the surface of the test chart is input. While the focus of the optical system is varied, the input images are input one after another. An image produced by adding up input images is then filtered by a proper restoration filter. The resultant image is then compared with the image acquired by bringing the optical system into focus. The restoration filter is adjusted so that the resultant image will be seen identical to the image acquired by bringing the optical system into focus. Thereafter, the resultant image is compared with the image acquired by bringing the optical system into focus. This operation is repeated in order to define a given restoration filter.

The ways of defining a restoration filter through simulation and experimentally have been described. Incidentally, the restoration filter is not always requested to return the characteristic of an image with respect to frequencies into that of an image acquired by bringing an optical system into focus. For example, the restoration filter may be requested to enhance a high-frequency component of image data so as to produce a "sharp" image. On the contrary, the restoration filter may be requested to produce a soft-focus image or an image that is acquired by bringing an optical system into focus but appears soft.

Next, an image taking apparatus in accordance with the third embodiment of the present invention will be described.

Figure 22:
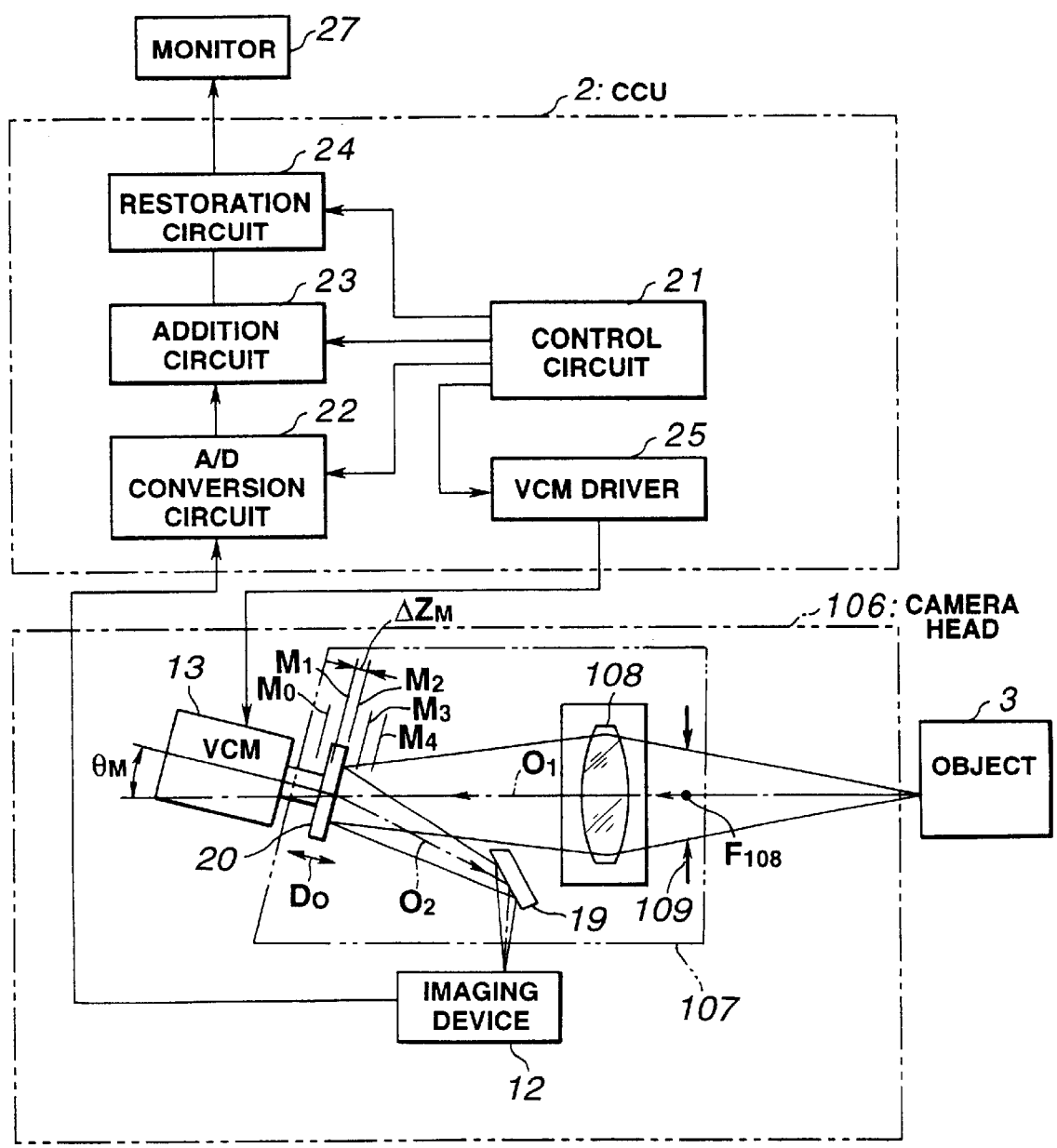
FIG. 22 is a block diagram showing the configuration of an image taking apparatus in accordance with the third embodiment of the present invention.
Figure 23:
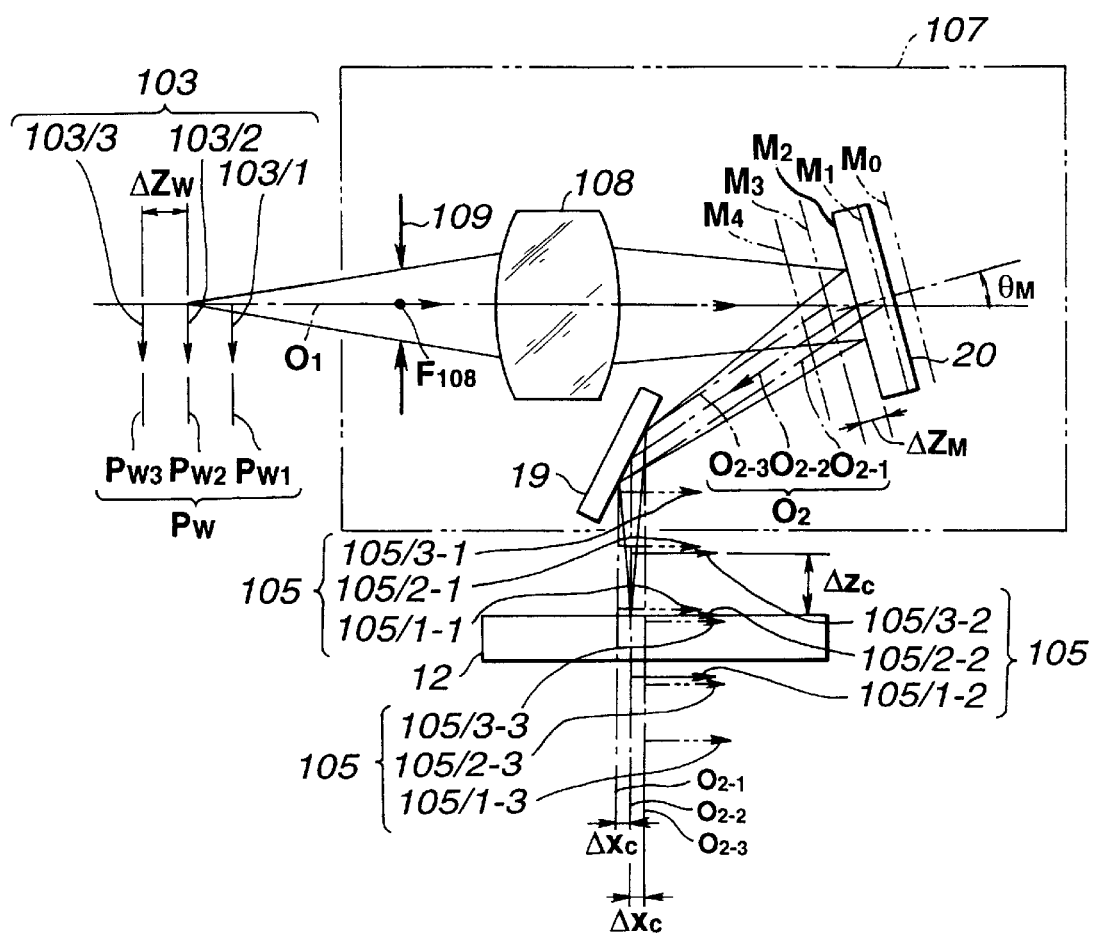
FIG. 23 is a diagram showing optical paths in an imaging optical system in the image taking apparatus shown in FIG. 22.
Figure 24:
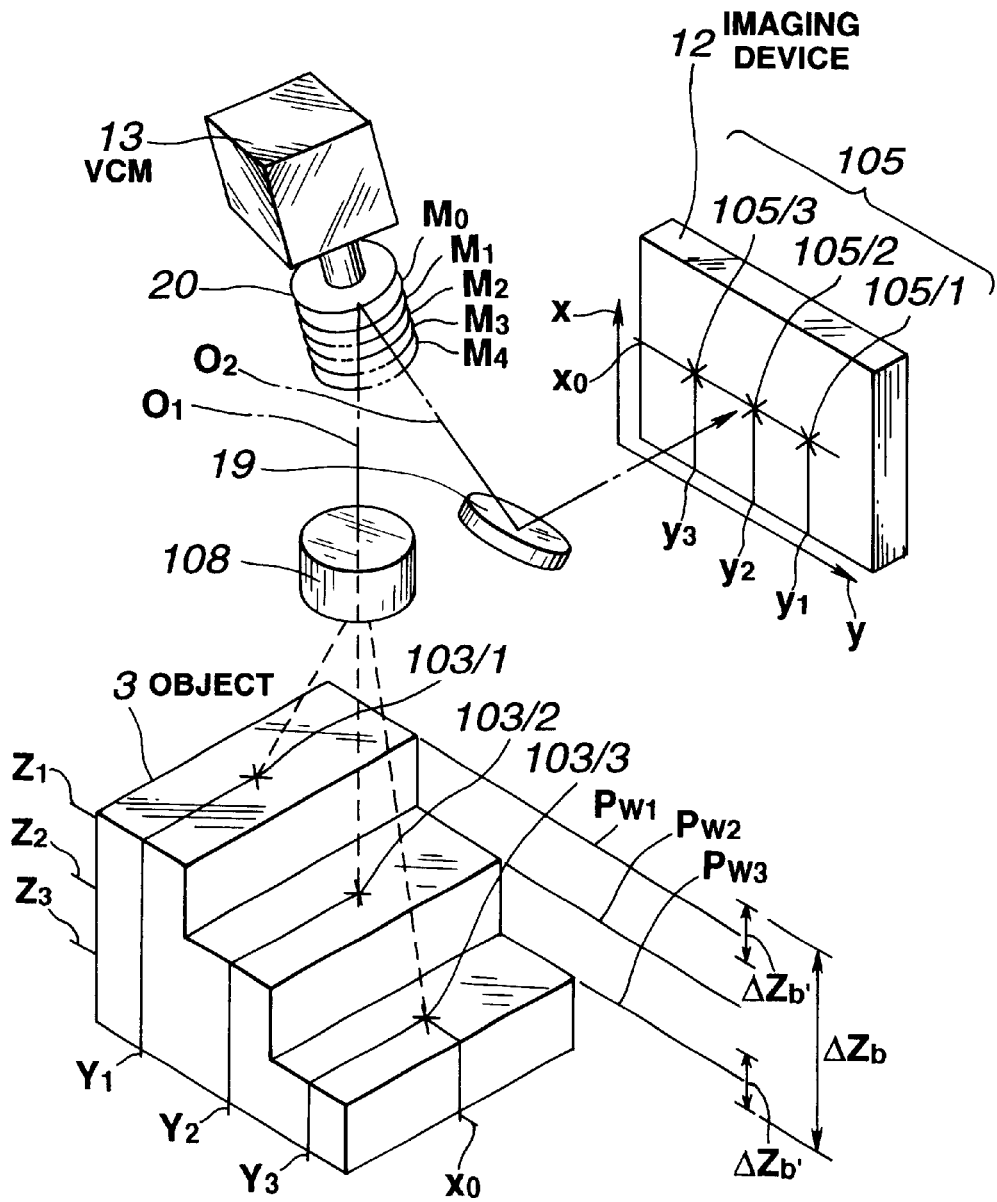
FIG. 24 is an oblique view showing the relationship among an object, and the imaging optical system and movable mirrors included in the image taking apparatus shown in FIG. 22.

FIG. 22 is a block diagram showing the image taking apparatus of the third embodiment. FIG. 23 is a diagram showing optical paths in an imaging optical system in the apparatus. FIG. 24 is an oblique view showing the relationship among an object and the imaging optical system and movable mirror included in the apparatus.

The image taking apparatus of this embodiment can be used as a close-up imaging apparatus capable of acquiring an image that provides a large depth of field, and consists mainly of a camera head 106, a camera control unit (CCU) 2, and a monitor 27.

The CCU 2 and monitor 27 are identical to those employed in the apparatus of the first embodiment described in conjunction with FIG. 1. The reference numerals will be assigned to the same components. Moreover, an object 3 to be imaged by the apparatus shall be a three-dimensional object whose axis Z coincides with the optical axis $0_1$ of the imaging optical system.

The camera head 106 consists mainly of an imaging optical system 107 for acquiring object light and forming an image depicted by the light, an imaging device 12, a voice coil motor (VCM) 13 for driving a movable mirror 20 so as to vibrate it in a direction $D_0$.

The components will be described below.

As shown in FIG. 22 and FIG. 23, the imaging optical system 107 includes, an image formation lens 108, an aperture stop 109, a movable mirror 20 that is a plane mirror capable of making a parallel movement sequentially, and a stationary mirror 19 that is a plane mirror. The movable mirror 20 is tilted by an angle $\Theta_M$ with respect to the optical axis $0_1$ along which incident light propagates. The mirrors are positioned in the imaging optical system 107 so that the frequency by which each mirror reflects light is an even number of times. An image on the imaging device 12 is an erect image.

As seen in FIG. 23 showing the optical paths, the aperture stop 109 is located at a focus $F_{108}$ of the image formation lens 108 in the object space. The imaging optical system 107 is a telecentric system whose exit pupil exists to infinity.

Object light rays emanating from objects 103 contained in a plurality of object planes $P_W$ defined in the vicinity of the object 3 to be imaged are refracted by the image formation lens 108 on the optical axis $0_1$ along which incident light propagates. The object light rays are reflected in the direction of an optical axis $0_2$ along which reflected light propagates by means of the movable mirror 20, and are then reflected by the stationary mirror 19. Finally, images 105 are formed on the imaging device 12.

In FIG. 23 and others, subscripts following a slash denotes different positions at which the object planes are located and the images contained therein. Subscripts following a hyphen are assigned to the images acquired by driving the movable mirror 20 to positions $M_1$ to $M_3$.

When the movable mirror 20 is located at the reference position $M_2$, light rays emanating from the objects 103/1 to 103/3 form images 105/1-2 to 105/3-2. An image converged on the imaging device 12 is the image 105/2-2. The images 105/1-2 and 105/3-2 are therefore dim images.

Thereafter, the movable mirror 20 is shifted toward to the image formation lens 108. When the movable mirror 20 reaches the position $M_3$, light rays emanating from the objects 103/1 to 103/3 are deflected by a distance $\Delta z_c$ along the optical axis and form images 105/1-3 to 105/3-3. A light ray converged on the imaging device 12 is the one forming the image 105/3-3. The images 105/1-3 and 105/2-3 are therefore dim images. Furthermore, the optical axis $0_{2-3}$ along which reflected light propagates is deflected by a distance $\Delta x_c$ over the image plane with respect to the optical axis $0_{2-2}$ along which reflected light propagates. All the images 105/1, 2, and 3-3 are also deflected by the distance $\Delta x_c$ from the images 105/1, 2, and 3-2.

When the movable mirror 20 is shifted away from the image formation lens 108 and reaches the position $M_1$, light rays emanating from the objects 103/1 to 103/3 form images 105/1-1 to 105/3-1. That is to say, what is converged on the imaging device 12 is the light rays forming the image 105/1-1. The images 105/2-1 and 105/3-1 are therefore dim images. Furthermore, the optical axis $0_{2-1}$ along which reflected light propagates is deflected by a distance $\Delta x_c$ over the image plane with respect to the optical axis $0_{2-2}$ along which reflected light propagates. All the images 105/1, 2, and 3-1 are also deflected by a distance $\Delta x_c$ from the images 105/1, 2, and 3-2.

As mentioned above, according to the image taking apparatus of this embodiment, the focal point of the imaging optical system can be shifted merely by moving the movable mirror 20. By shifting the focal point, images can be acquired for realizing, as shown in FIG. 24, a large depth of field (corresponding to a range $\Delta Z_b$ in FIG. 24).

Assuming that a distance by which the movable mirror is moved is $\Delta Z_M$, a deflection of an image along the optical axis in the image taking apparatus, $\Delta z_c$, and a deflection thereof over the image plane, $\Delta x_c$, are given as follows:

$$\Delta x_c = 2 \cdot \Delta Z_M \cdot \sin \Theta_M \quad (12)$$

$$\Delta z_c = 2 \cdot \Delta Z_M / \cos \Theta_M \quad (13)$$

Assuming that a distance between each pair of the objects 103/2 to 103/3 is $\Delta Z_W$ and the lateral magnification provided by the imaging optical system 107 is $\beta_{107}$, a deflection of an image along the optical axis, $\Delta z_c$, is given as follows:

$$\Delta z_c = \beta_{107}^2 \cdot \Delta Z_W \quad (14)$$

Based on the expressions (13) and (14), the distance $\Delta Z_W$ between objects is expressed as follows:

$$\Delta Z_W = 2 \cdot \Delta Z_M / (\cos \Theta_M \cdot \beta_{107}^2) \quad (15)$$

The expression (15) demonstrates that when the lateral magnification $\beta_{107}$ is smaller, even if the movable mirror 20 is moved only a bit, the focus of the optical system is shifted more greatly in the object space. This characteristic is also exhibited by the image taking apparatus of the first embodiment.

When the movable mirror 20 is located at the positions $M_1$, $M_2$, and $M_3$, light rays forming the images of the objects 103/1, 103/2, and 103/3 are converged on the imaging device 12. In actual imaging, therefore, for attaining a depth of field that corresponds to the range from the object 103/1 to 103/3 defined on the same object in FIG. 23, the movable mirror 20 must be vibrated with at least an amplitude $2 \cdot \Delta Z_M$ corresponding to a range containing the position $M_2$ as a center. Preferably, the movable mirror should be vibrated with a larger amplitude than the amplitude $2 \cdot \Delta Z_M$, for example, an amplitude $4 \cdot \Delta Z_M$ or larger corresponding to a range containing the position $M_2$ as a center.

Figure 25:
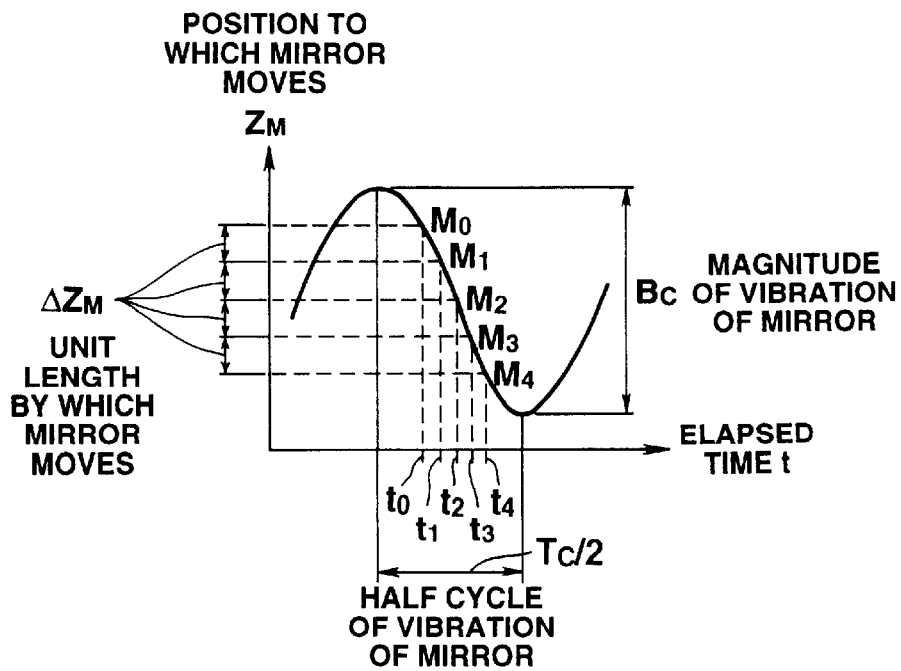
FIG. 25 is a diagram showing a wave representing a vibration made by the movable mirrors in the image taking apparatus shown in FIG. 22.
Figure 29:
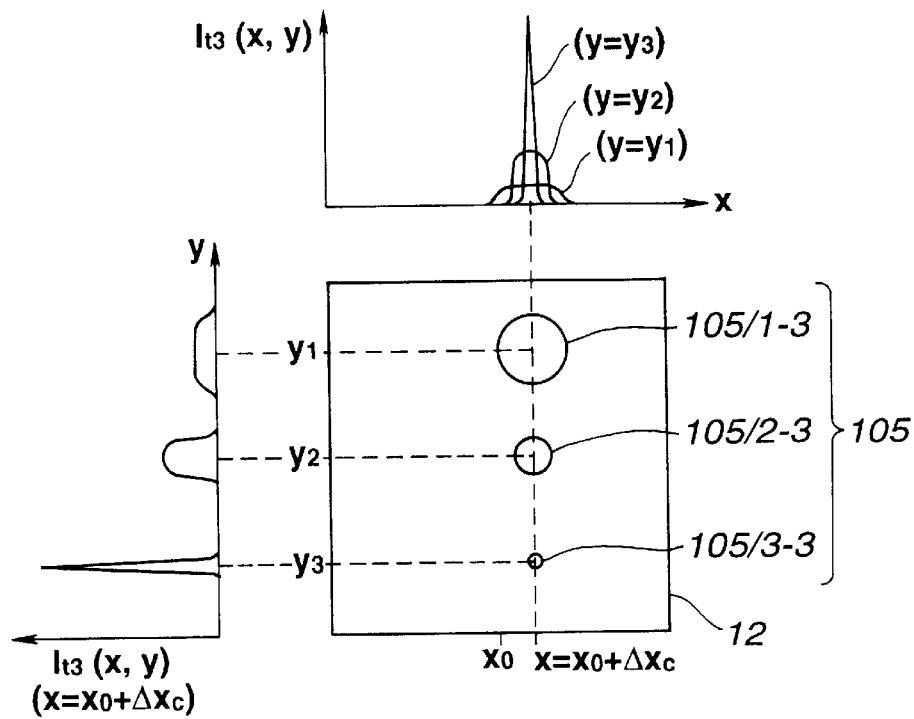
FIG. 29 is a diagram showing distributions of illuminance levels indicated by object images, which are acquired by the image taking apparatus shown in FIG. 22 at an elapsed time instant t3, and models of point spreads.
Figure 30:
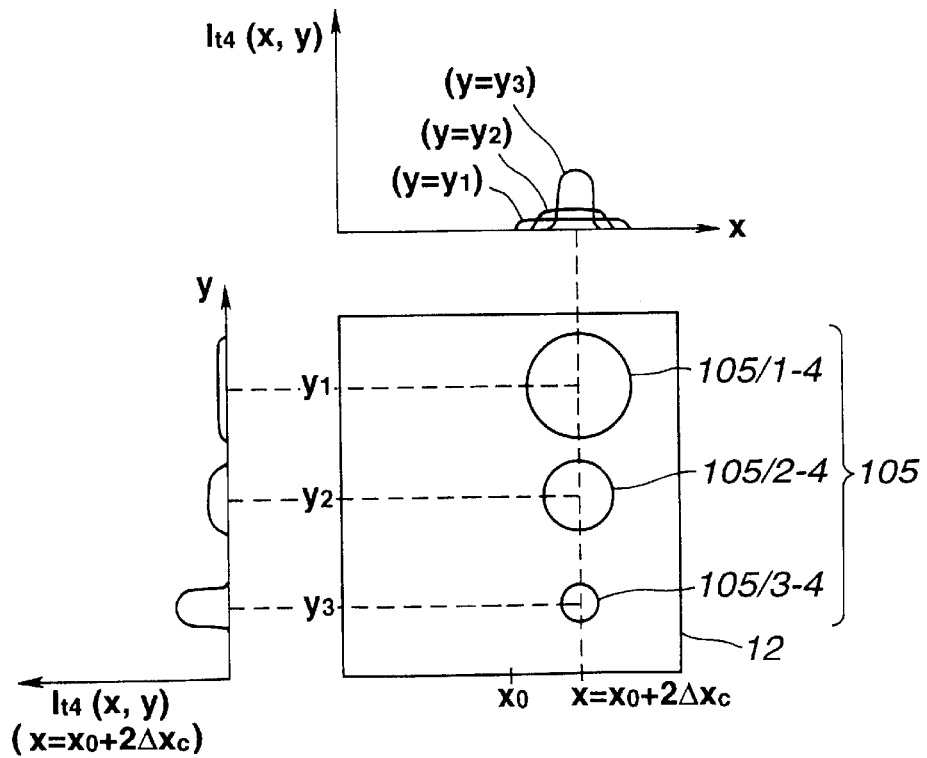
FIG. 30 is a diagram showing distributions of illuminance levels indicated by object images, which are acquired by the image taking apparatus shown in FIG. 22 at an elapsed time instant t4, and models of point spreads.
Figure 31:
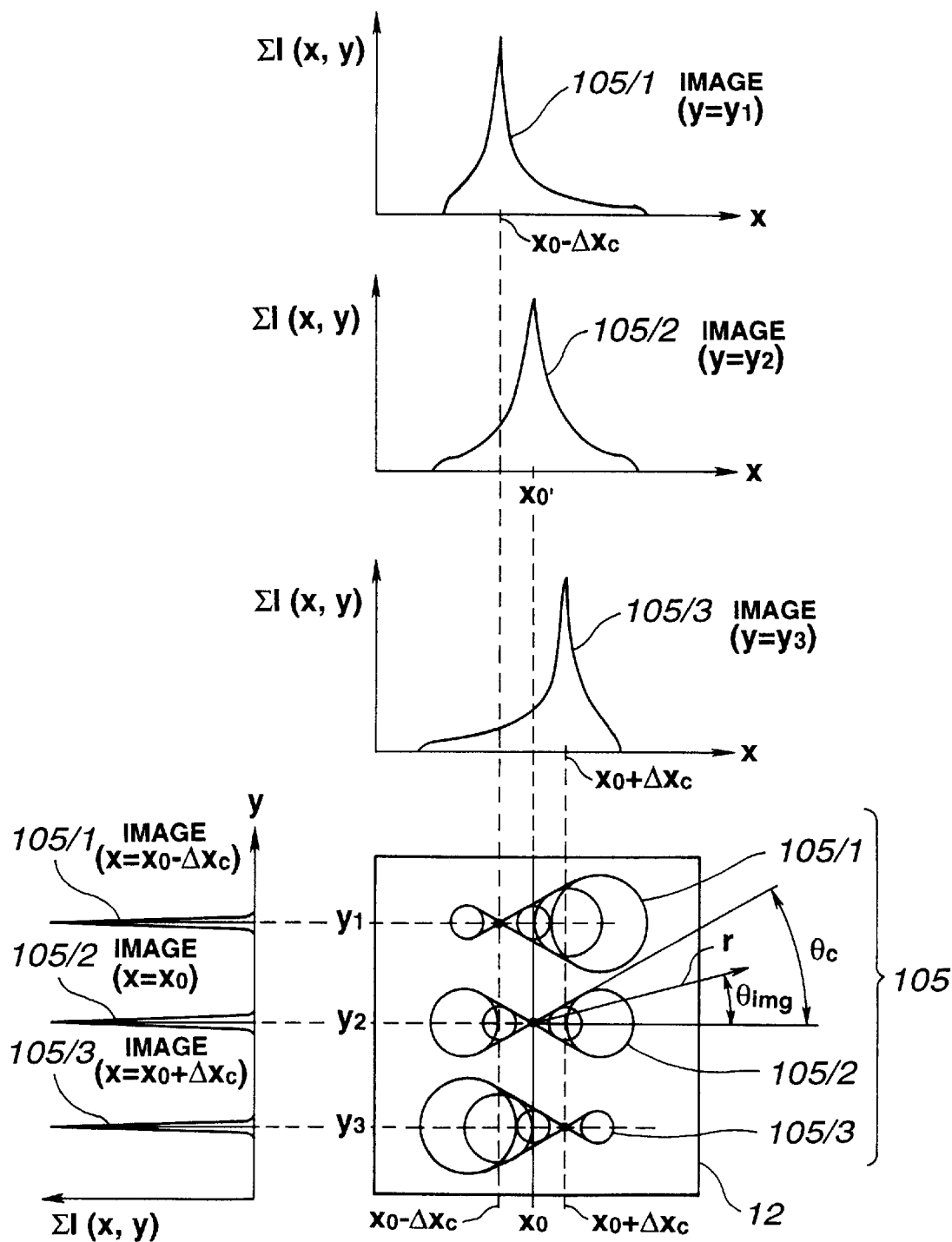
FIG. 31 is a diagram showing distributions of illuminance levels indicated by object images or distributions of amounts of light calculated by adding up the amounts of light in FIGS. 26 to 30 indicated by the object image that are acquired by the image taking apparatus shown in FIG. 22, and models of point spreads.
Figure 32:
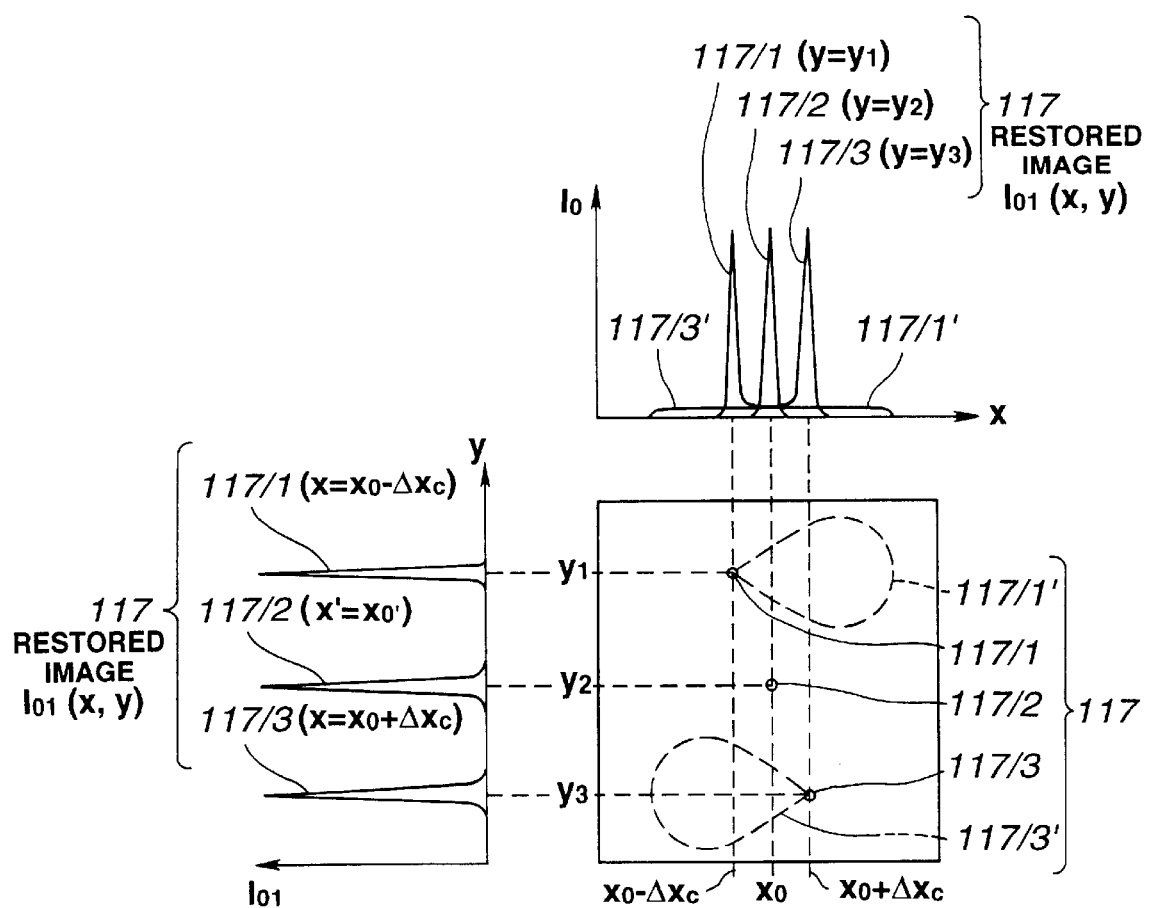
FIG. 32 is a diagram showing distributions of illuminance levels indicated by object image data produced by restoring additive data shown in FIG. 31 in the image taking apparatus shown in FIG. 22, and models of point spreads.

Imaging operations performed by the image taking apparatus of this embodiment having the aforesaid components will be described in conjunction with FIGS. 22 to 24 as well as FIGS. 25 to 32. FIG. 25 is a diagram showing a wave that represents a vibration made by the movable mirror. FIGS. 26 to 30 are diagrams showing distributions of illuminance levels indicated by object images that are acquired at different elapsed time instants and models of point spreads. FIG. 31 is a diagram showing amounts of light calculated by adding up those shown in FIGS. 26 to 30, and indicated by the object images. FIG. 32 is a diagram showing a distribution of illuminance levels indicated by object image data produced by restoring the additive data graphically shown in FIG. 31 and models of point spreads.

When the image taking apparatus of this embodiment is used for imaging, a plurality of object planes $P_W$ are defined in the vicinity of an object 103. For example, as shown in FIG. 24, object planes $P_{W1}$, $P_{W2}$, and $P_{W3}$ are defined. Objects 103/1, 103/2, and 103/3 that are point sources on the object planes $P_{W1}$, $P_{W2}$, and $P_{W3}$ are used as examples of parts of the object 103. A wave representing a vibration made by the movable mirror 20 is a sine wave shown in FIG. 25. Positions $M_1$, $M_2$, and $M_3$ to which the movable mirror 20 is moved are positions at which the optical system is focused on the objects 103/1, 103/2, and 103/3 that are point sources.

In the foregoing state, the VCM 13 is driven in order to vibrate the movable mirror 20 with a maximum amplitude $B_c$. At elapsed time instants $t_0$, $t_1$, $t_2$, $t_3$ and $t_4$, an output signal of the imaging device 12 is input to the A/D conversion circuit 22. At the elapsed times $t_0$, $t_1$, $t_2$, $t_3$ and $t_4$, the movable mirror 20 is located at the positions $M_0$, $M_1$, $M_2$, $M_3$, and $M_4$ respectively.

FIGS. 26 to 30 show models each depicting a change in degree of dims in the images 105 on the imaging device 12 occurring while the movable mirror 20 is moved in such a manner that it is located at the positions $M_0$, $M_1$, $M_2$, $M_3$, and $M_4$ at the elapsed time instants $t_0$, $t_1$, $t_2$, $t_3$ and $t_4$. These Figures imply a time-passing change of distributions of illuminance levels $I_{tn}(x, y)$ observed along the x and y axes of the object.

Figure 26:
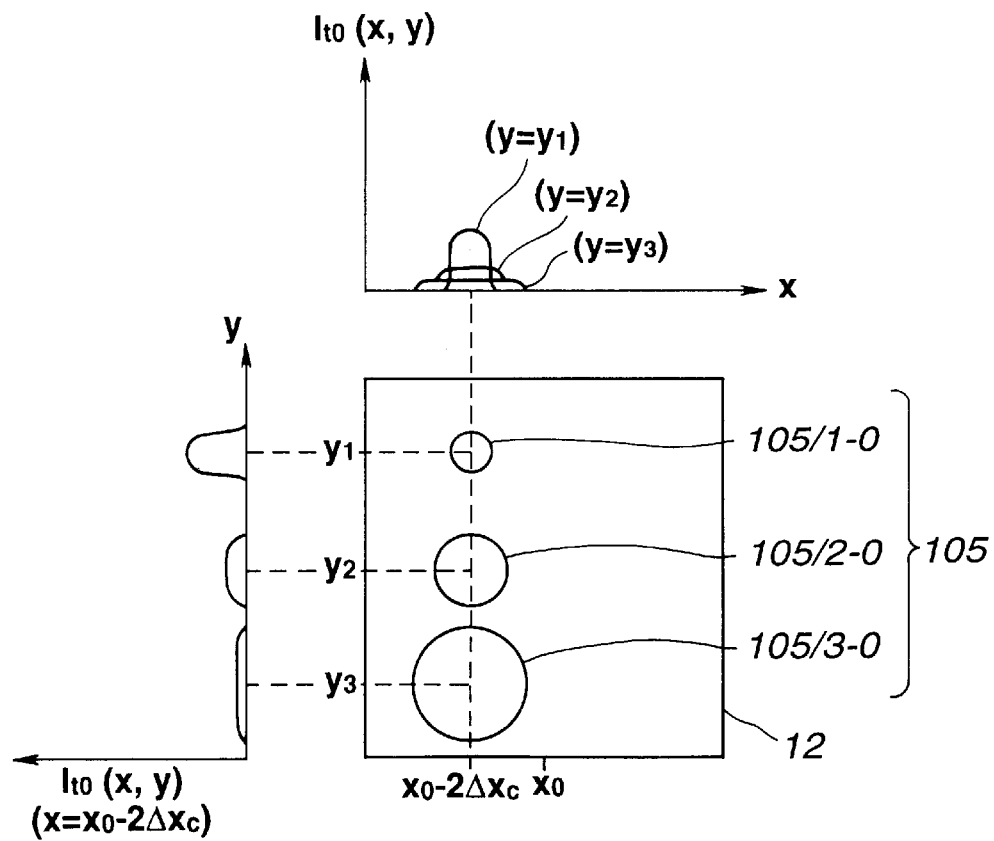
FIG. 26 is a diagram showing distributions of illuminance levels indicated by object images, which are acquired by the image taking apparatus shown in FIG. 22 at an elapsed time instant t0, and models of point spreads.

At the elapsed time instant $t=t_0$, as shown in FIG. 26, all the images 105/1-0 to 105/3-0 are dim. The x coordinate of the images on the imaging device is as follows:

$$x=x_0-2\cdot\Delta x_c$$

Figure 27:
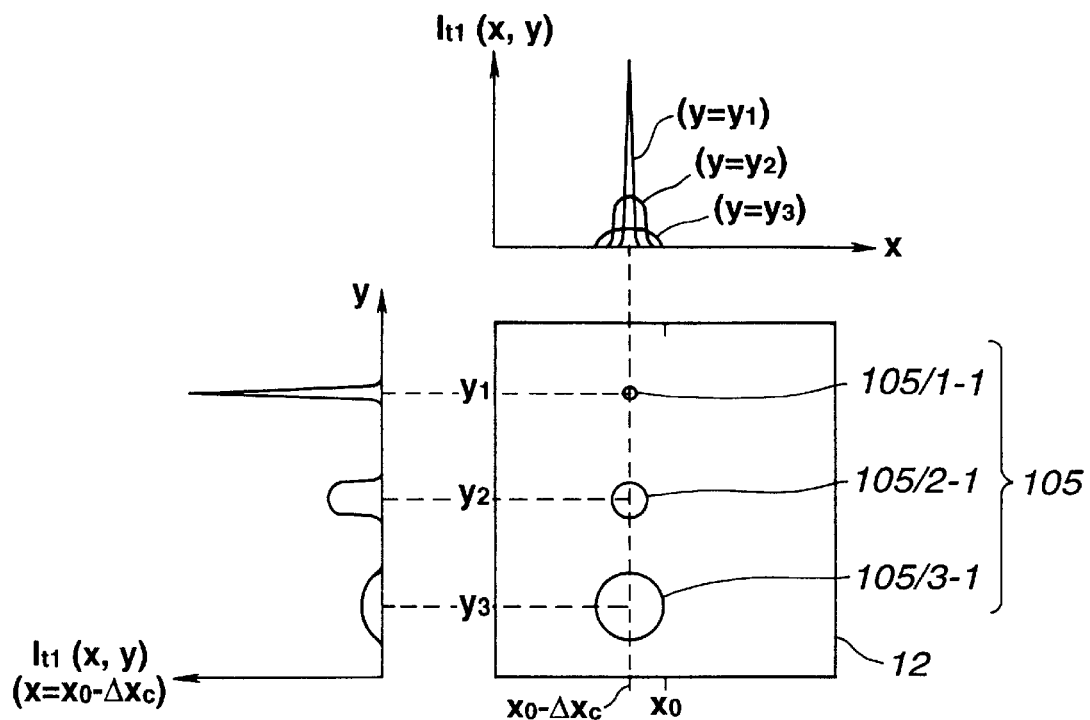
FIG. 27 is a diagram showing distributions of illuminance levels indicated by object images, which are produced by the image taking apparatus shown in FIG. 22 at an elapsed time instant t1, and models of point spreads.

At the elapsed time $t=t_1$, as shown in FIG. 27, the image 105/1-1 is in focus but the images 105/2-1 and 105/3-1 are dim. The x coordinate of the images on the imaging device is as follows:

$$x=x_0-\Delta x_c$$

Thus, the images are deflected in a positive direction relative to those formed at the elapsed time instant $t=t_0$.

Figure 28:
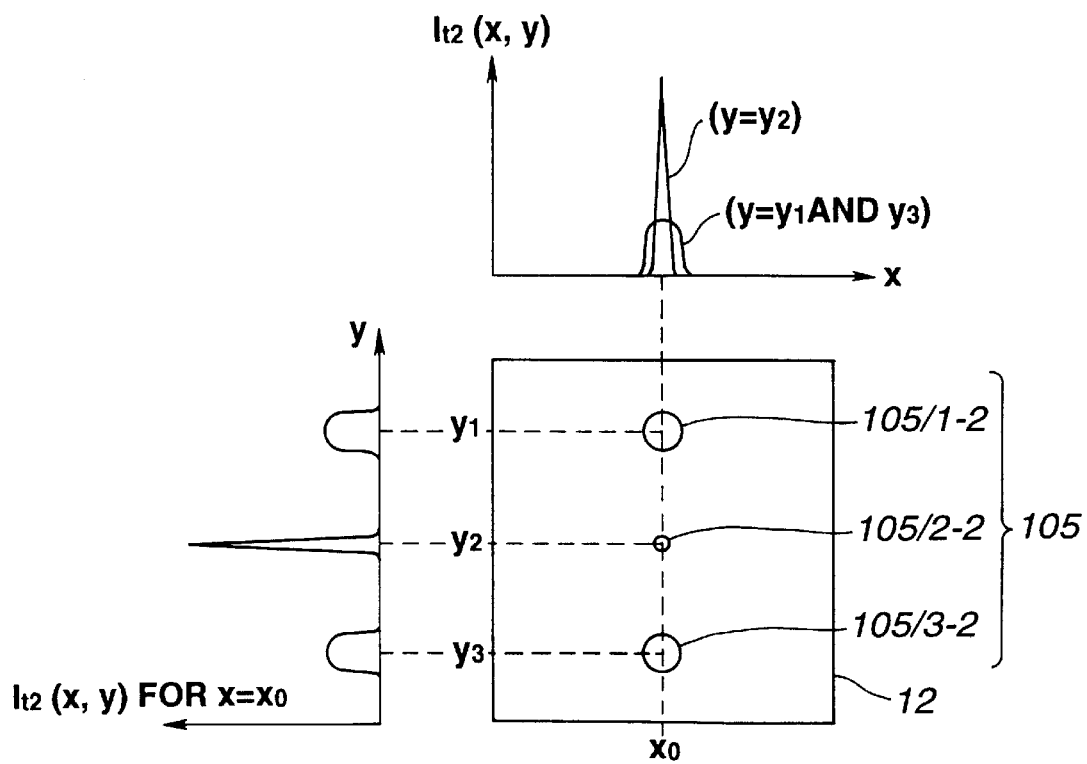
FIG. 28 is a diagram showing distributions of illuminance levels indicated by object images, which are acquired by the image taking apparatus shown in FIG. 22 at an elapsed time instant t2, and models of point spreads.

Furthermore, at the elapsed time instant $t=t_2$, as shown in FIG. 28, the image 105/2-2 is in focus but the images 105/1-2 and 105/3-2 are dim. The x coordinate of the images on the imaging device is as follows:

$$x=x_0$$

Thus, the images are further deflected in the positive direction relative to those formed at the elapsed time instant $t=t_1$. At the elapsed time instant $t_3$, as shown in FIG. 29, the image 105/3-3 is in focus but the images 105/1-3 and 105/2-3 are dim. At the elapsed time instant $t_4$, as shown in FIG. 30, all the images 105/1-4, 105/2-4, and 105/3-4 are dim. During a time interval between the elapsed time instants $t_0$ to $t_4$, the formation point (x coordinate) and dimness of the images 105 vary.

Image data items presenting a change of the distributions of illuminance levels $I_{t0}(x, y)$ to $I_{t4}(x, y)$ are added up by the addition circuit 23. FIG. 31 show resultant point spreads observed on the XY plane on the imaging device 12, and resultant distributions of illuminance levels, $\Sigma I(x, y)$ observed along the x and y axes of the object. Images 105/1, 105/2, and 105/3 in FIG. 31 are additive images to be added up. The signals representing the images contain low-frequency components indicating spatial frequencies, that is, signals representing the object images that are out of focus.

Thereafter, the restoration circuit 24 carries out restoration. FIG. 32 shows a distribution of intensities of light $I_{o1}(x, y)$ indicated by image data resulting from restoration and observed along the x and y axes of the object. As apparent from FIG. 32, an image 117 providing a large depth of field and including images of the objects 103/1, 103/2, and 103/3 representative of an object to be imaged which are in focus can be produced.

Among the images resulting from restoration, the images 117/1 and 117/3 except the one of the object located at a point of a y coordinate $y=y^2$ contain the dim image components 117/1' and 117/3' respectively. However, the ratio of the components to the resultant images is negligible. No problem therefore occurs in practice.

Addition performed by the addition circuit 23 and restoration performed by the restoration circuit 24 will be described later in conjunction with FIGS. 34 to 39.

In the image taking apparatus of the first embodiment, it is possible that the transmittance of light may deteriorate due to the existence of the half mirror on an optical path. However, the image taking apparatus of this embodiment includes no half mirror and can therefore converge light incident on the image formation lens 108 on the imaging device 12 substantially without any loss. According to the method employed in this embodiment, an image can be input with high sensitivity.

Moreover, in the image taking apparatus of this embodiment, image formation on an intermediate image plane is not carried out. The necessity of a field lens and second image formation lens is therefore obviated. In other words, only the image formation lens 108 is needed as an image formation optical system. Accordingly, the image taking apparatus can advantageously be manufactured with a small number of components at low cost.

Next, an image taking apparatus in accordance with the fourth embodiment of the present invention will be described.

Figure 33:
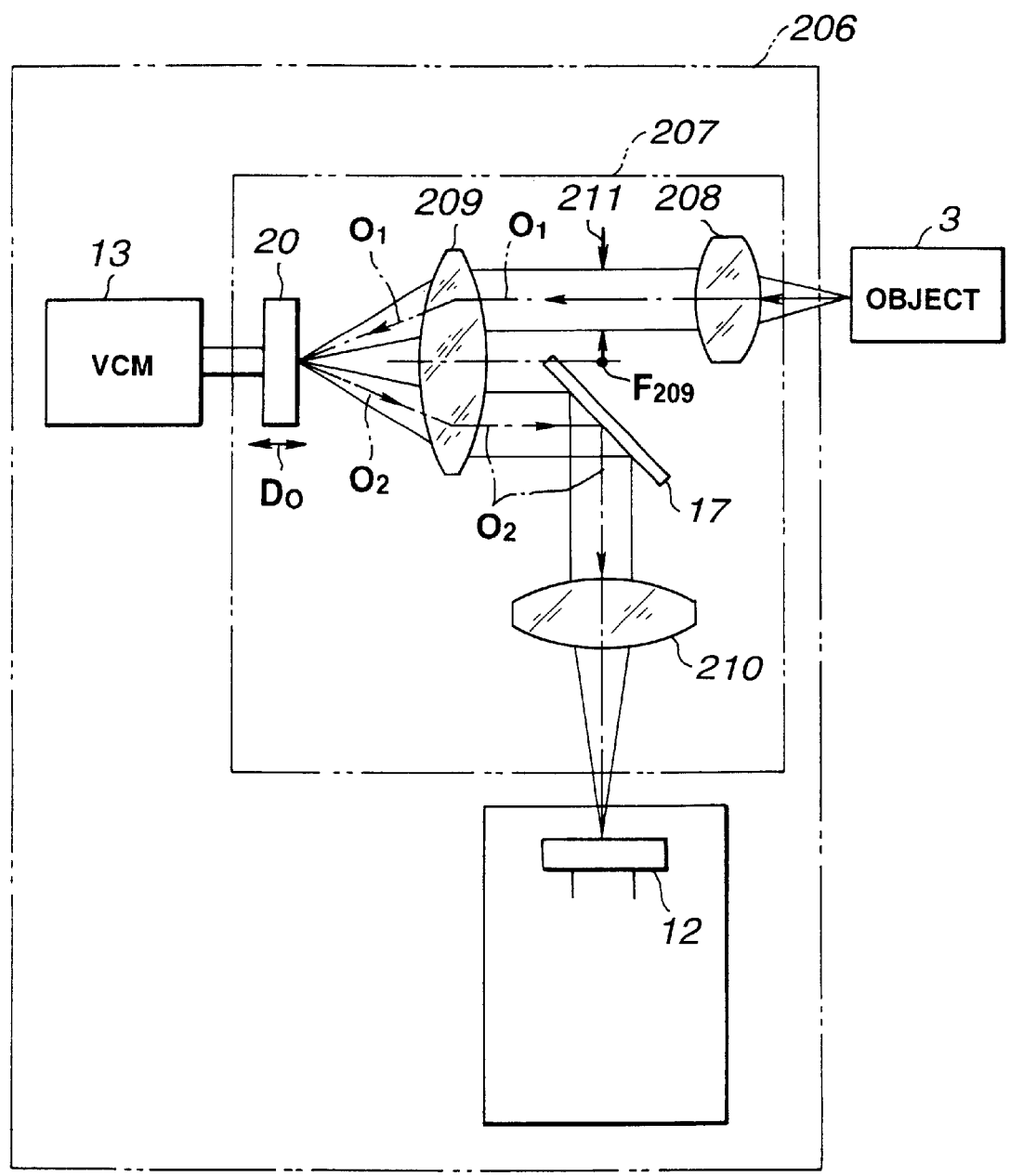
FIG. 33 is a block diagram showing the configuration of a camera head included in an image taking apparatus in accordance with the fourth embodiment of the present invention.

FIG. 33 is a block diagram showing a camera head 206 included in the image taking apparatus of this embodiment. An imaging optical system 207 included in the image taking apparatus of this embodiment is different from the imaging optical system 107 in the apparatus of the third embodiment in that an aperture stop 211 is interposed between an object lens 208 and an intermediate image formation lens 209. Consequently, the object lens can be operated in the far distance.

Specifically, the imaging optical system 207 incorporated in the camera head 206 of the apparatus comprises, as mentioned above, an objective lens 208, an eccentric intermediate image formation lens 209, a last-stage image formation lens 210, an aperture stop 211, the above constituting an image formation optical system, a movable mirror 20, and a mirror 17. The other components to be incorporated in the camera head 206, that is, a VCM 12 and imaging device 12, a CCU 2 and monitor 4 that are components of the image taking apparatus are identical to those of the image taking apparatus of the first embodiment shown in FIG. 1.

In the image taking apparatus of this embodiment, light emanating from the object 3 is refracted by the objective lens 208 to be thus collimated into substantially parallel light rays, transmitted by the aperture stop 211, and then converged by the intermediate image formation lens 209 to form an intermediate image in the vicinity of the reflecting surface of the movable mirror 20. The light is then reflected by the reflecting surface of the movable mirror 20, refracted by the intermediate image formation lens 209 to be collimated into substantially parallel light rays again, reflected by the mirror 17, and then converged by the image formation lens 210 to form a final image on the imaging device 12. The aperture stop 211 is located at a focus $F_{209}$ of the intermediate image formation lens 209 in the object space. The intermediate image formation lens 209 is therefore telecentric in terms of an entrance pupil.

Even in the image taking apparatus of this embodiment, the VCM 13 is driven in order to shift the focus of the imaging optical system amd acquire a plurality of images. The images are added up, and then restored. Thus, an image providing a large depth of field is produced. The processing steps are identical to those in the apparatus of the third embodiment.

In the case of the apparatus of the third embodiment, only the imaging lens 108 is used as an imaging lens system. The aperture stop 109 must be interposed between the imaging lens 108 and object 3 in order to construct a telecentric system. By contrast, in the apparatus of this fourth embodiment, since the aperture stop 211 is interposed between the objective lens 208 and intermediate image formation lens 209, a distance at which the apparatus works on the object 3 can be increased.

The operations of the addition circuit and restoration circuit included in the image taking apparatus of the third or fourth embodiment are identical to those in the image taking apparatus of the first embodiment which have been described in conjunction with FIGS. 15, 16, and 17.

Now, a method of designing a restoration filter used for restoration in the apparatus of the third or fourth embodiment will be described in conjunction with FIGS. 34 to 39.

Figure 34:
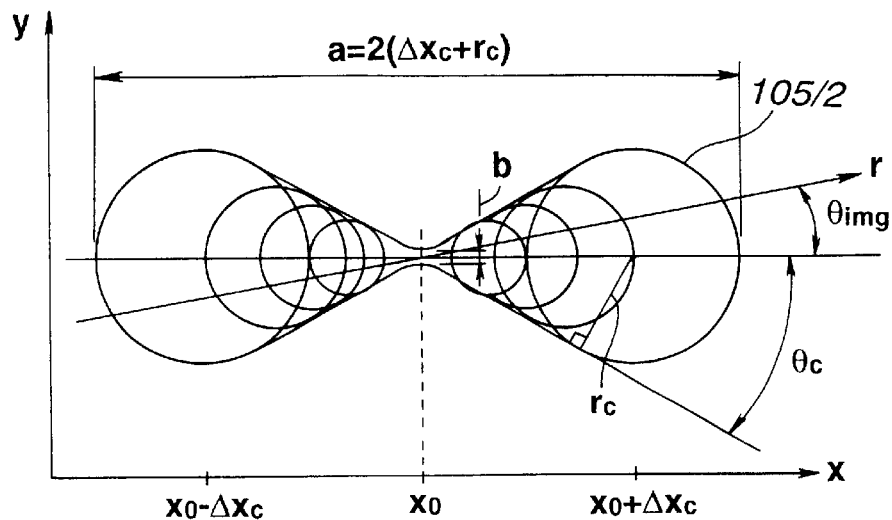
FIG. 34 is an enlarged diagram showing a pattern of dims observed in the additive images, which are graphically shown in FIG. 31, in the image taking apparatus shown in FIG. 22.

To begin with, a distribution of illuminance levels and power spectrum exhibited by an additive image will be described. FIG. 34 shows an enlarged one of a dimness pattern of the additive image 105/2 shown in FIG. 31. The description will proceed on the assumption that the image is an integral image produced by integrating (adding up) images produced while the movable mirror 20 is displaced within a range of $\pm\Delta Z_M$. Even when the range is larger, the method to be described later can be adopted.

The additive image 105/2 appears like a numeral of 8 as shown in FIG. 34. When the mirror is displaced by a distance of $\pm\Delta Z_M$, the diameter of a round dim becomes maximum. Assuming that the numerical aperture of the optical system is NA, the radius of the round dim, rc, is given as follows on the basis of the expression (13):

$$rc = NA \cdot \Delta Z_c \qquad (16)$$
$$= 2NA \cdot \Delta Z_M / \cos\theta_m$$

Herein, the system of polar coordinates (r, $\Theta_{img}$) having the center of an image as an origin is employed. The diameter of the dim becomes maximum when the angle $\Theta_{img}$ is 0. The width of the dim, a, is expressed as follows:

$$a = 2(\Delta X_c + rc) \qquad (17)$$
$$= 2(2\Delta Z_M \cdot \sin\theta_M + 2NA \cdot \Delta Z_M / \cos\theta_M)$$
$$= 4\Delta Z_M(\sin\theta_M + NA / \cos\theta_M)$$

Moreover, the diameter of the dim become minimum when the angle $\Theta_{img}$ is $\pi/2$. The minimum width of the dim, b, is equal to the diameter of the Airy disk and is expressed as follows:

$$b = 1.22\lambda/NA \qquad (18)$$

where $\lambda$ denotes a wavelength.

Assuming that the angle $\Theta_{img}$ at which the diameter of the dim changes greatly is $\Theta_c$, the angle $\Theta_c$ is expressed as follows:

$$\Theta_c = \sin^{-1}(NA/(\cos\Theta_M \cdot \sin\Theta_M)) \qquad (19)$$

Incidentally, when the angle $\Theta_{img}$ equal to the value $\Theta_c$, the diameter of the dim is 2rc.

Figure 35:
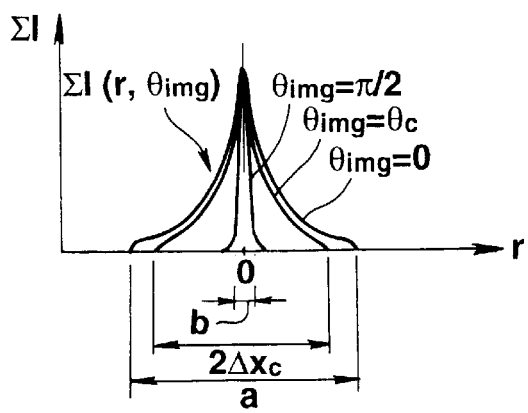
FIG. 35 is a diagram showing distributions of illuminance levels in a direction r indicated by the additive images, which are graphically shown in FIG. 31, in the image taking apparatus shown in FIG. 22.

The diameter of the dim decreases gradually within a range of $0 \leq \Theta_{img} \leq \Theta_c$. When the angle $\Theta_{img}$ exceeds the value $\Theta_c$, the diameter of the dim decreases greatly. Within a range of $\Theta_c < \Theta_{img} \leq \pi/2$, the diameter of the dim decreases gradually. This change in diameter is expressed in the form of a distribution of illuminance levels observed in a direction r, $\Sigma I(r, \Theta_{img})$, as shown in FIG. 35. As apparent from FIG. 35, when the angle $\Theta_{img}$ is 0, the dim spreads widely. When the angle $\Theta_{img}$ is $\pi/2$, no dim appears. The curves express the point spread functions inherent to the optical system in this embodiment.

Figure 36:
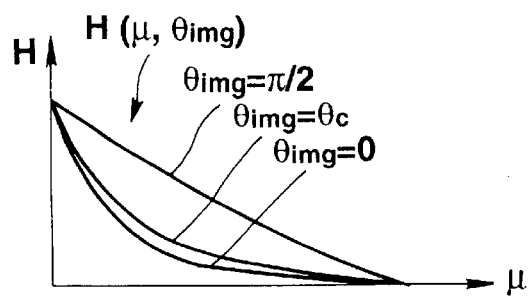
FIG. 36 is a diagram showing curves expressing power spectra indicated by the additive images, which are graphically shown in FIG. 31, in the image taking apparatus shown in FIG. 22.

Fourier transform of the point spread functions results in power spectrum curves $H(\mu, \Theta_{img})$ shown in FIG. 36. The curves express the characteristics of the imaging optical system with respect to contrast, that is, the optical transfer functions (OTF)s thereof. As apparent from FIG. 36, when the angle $\Theta_{img}$ is $\pi/2$, the OTF is similar to a transfer function producing an ideal in-focus image. When the angle $\Theta_{img}$ is equal to or larger than 0 and smaller than $\pi/2$, the contrast deteriorates. Once the deteriorated contrast is compensated for by carrying out restoration, ideal contrast can be attained irrespective of the angle $\Theta_{img}$.

Ideally, assuming that a gain $V_1(\mu, \Theta_{img})$ produced by a restoration filter is defined as follows:

$$V_1(\mu, \Theta_{img}) = H(\mu, \pi/2)/H(\mu, \Theta_{img}) \qquad (20)$$

the arithmetic operation below to be calculated for restoration is provided to express an OTF producing an ideal image resulting from restoration.

$$H_{01}(\mu, \Theta_{img}) = H(\mu, \Theta_{img})/V1(\mu, \Theta_{img}) \qquad (21)$$

The distribution of illuminance levels $I_{01}(r, \Theta_{img})$ indicated by an image that is produced by the OTF has a portion indicating a dim removed therefrom. The image is in focus. However, as seen from the curves concerning the images 117/1 and 117/3 shown in FIG. 32, dims 117/1' and 117/3' cannot be fully removed, depending on a distance to an object. As apparent from the comparative review of the curves and models expressing the images 105/1, 105/2, and 105/3 in FIG. 31, a dim in an additive image gets partially large depending on a distance to an object, and the large dim cannot be removed even by applying the restoration filter. However, in reality, a signal level indicating such a dim is very low. The adverse effect of the dim on image quality is negligible.

With respect to a distribution of illuminance levels $\Sigma I(r, \Theta_{img})$ and a spectrum $H(\mu, \Theta_{img})$, when the angle $\Theta_{img}$ exceeds the value $\Theta_c$, they vary greatly. When the angle $\Theta_{img}$ is equal to or larger than 0 and equal to or smaller than the value $\Theta_c$, and is larger than the angle $\Theta_c$ and equal to or smaller than $\pi/2$, they vary a little.

A gain $V_2(\mu, \Theta_{img})$ produced by a restoration filter is expressed in a simplified manner as follows:

$$V_2(\mu, \Theta_{img}) = 1 (\Theta_c < \Theta_{img} \leq \pi/2) \qquad (22)$$

$$V_2(\mu, \Theta_{img}) = H(\mu, \pi/2)/H(\mu, \Theta_c)(0 \leq \Theta_{imbg} \leq \Theta_c \qquad (23)$$

Figure 37:
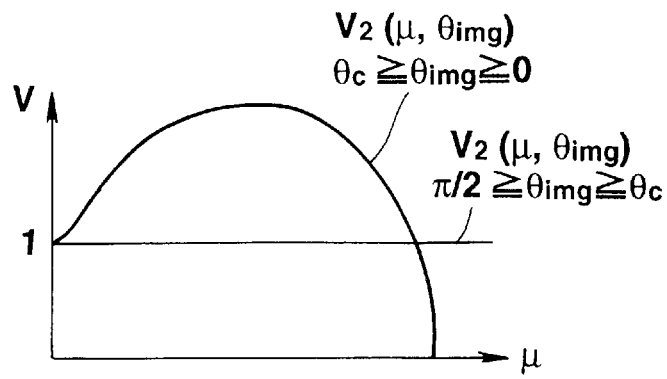
FIG. 37 is a diagram showing the power spectrum of an image restored by a restoration filter included in the image taking apparatus shown in FIG. 22.

The power spectrum indicated by an image produced by the restoration filter is shown in FIG. 37. When the gain produced by the restoration filter is the gain $V_2$, an arithmetic operation below to be carried out for restoration expresses an OTF producing the image resulting from restoration.

$$H_{02}(\mu, \Theta_{img}) = H(\mu, \Theta_{img}) \cdot V_2(\mu, \Theta_{img}) \quad (24)$$

Figure 38:
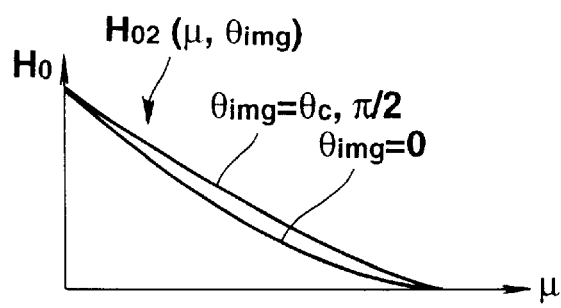
FIG. 38 is a diagram showing OTFs deriving from images restored by the image taking apparatus shown in FIG. 22.

The OTF $H_{02}(\mu, \Theta_{img})$ is plotted as shown in FIG. 38. In this case, when the angle $\Theta_{img}$ is equal to $\pi/2$ or the value $\Theta_c$, an image is restored ideally. Under any other condition, the OTF deteriorates a little (in FIG. 38, the angle $\Theta_{img}$ is 0 that is a typical value).

Figure 39:
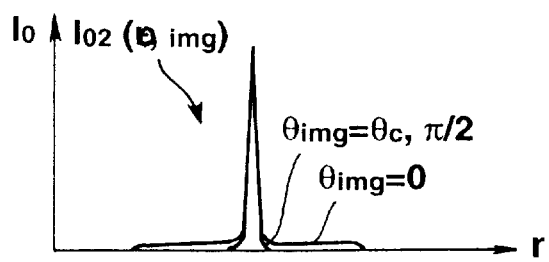
FIG. 39 is a diagram showing distributions of illuminance levels indicated by the images restored by the image taking apparatus shown in FIG. 22.

A distribution of illuminance levels $I_{02}(r, \Theta_{img})$ indicated by the thus produced image is plotted as shown in FIG. 39. Specifically, when the angle $\Theta_{img}$ is equal to $\pi/2$ or the value $\Theta_c$, an ideal point spread function is produced. Under any other condition, for example, when the angle $\Theta_{img}$ is 0, illuminance levels indicating a weak dim are contained in the distribution of illuminance levels. In practice, even the thus simplified restoration filter can provide sufficient image quality.

In order to design a restoration filter, data of a power spectrum $H(\mu, \Theta_{img})$ indicated by an additive image is needed. Software for simulating optical image formation is used to define a point spread function $\Sigma I(r, \Theta_{img})$ for an actual optical system. Two-dimensional Fourier transform is then performed on the point spread function. Needless to say, this method of calculation may not be adopted. An alternative method is such that a test chart or the like may be imaged actually by the image taking apparatus, and restoration is attempted repeatedly. A restoration filter may thus be defined.

Next, an image taking apparatus of the fifth embodiment of the present invention will be described.

Figure 40:
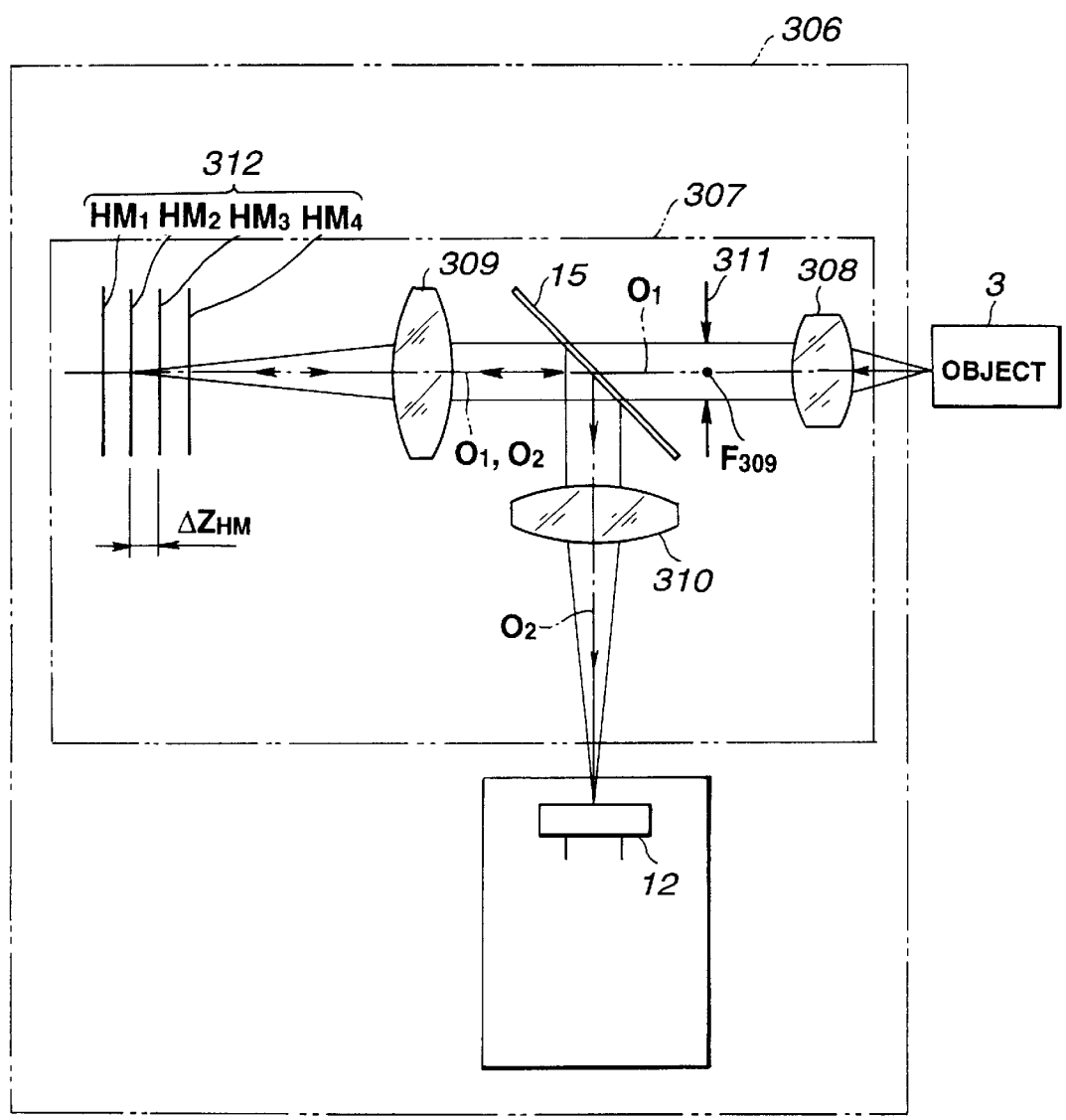
FIG. 40 is a block diagram showing the configuration of a camera head included in an image taking apparatus in accordance with the fifth embodiment of the present invention.

In the image taking apparatus of this embodiment, a camera head 306 shown in the block diagram of FIG. 40 is substituted for the camera head 1 included in the apparatus of the first embodiment shown in FIG. 1. That is to say, an imaging optical system employing neither the VCM 13 nor the movable mirror 20 but using a group of a plurality of stationary mirrors is employed. In the apparatus of this embodiment, addition performed by an electrical circuit is unnecessary. Moreover, since the VCM is not needed, the addition circuit 23 and VCM driver 25 included in the CCU 2 shown in FIG. 1 become unnecessary. The other components are identical to those of the apparatus of the first embodiment shown in FIG. 1.

The camera head 306 of the image taking apparatus of this embodiment is composed of an imaging optical system 307 and imaging device 12. The imaging optical system 307 includes, as an image formation optical system, an objective lens 308, an intermediate image formation lens 309, a last-stage image formation lens 310, an aperture stop 311, a group of mirrors 312, and a half mirror 15.

The group of mirrors 312 includes a full-reflection mirror $HM_1$ located at the extreme back end and three half mirrors $HM_2$, $HM_3$, and $HM_4$ located in front of the mirror HM1. The mirrors $HM_1$, $HM_2$, $HM_3$, and $HM_4$ are mutually parallel and spaced by a distance $\Delta Z_{HM}$ and fixed to a body of the imaging optical system 307. It is unnecessary to drive the mirrors so as to vibrate it using a VCM or the like. The aperture stop 311 is located at a focus of the intermediate image formation lens 309 in the object space. The intermediate image formation lens 309 is therefore telecentric in terms of an entrance pupil equivalent to an intermediate image.

In the image taking apparatus of this embodiment, unlike the apparatuses of the third and fourth embodiments, images are not acquired time-sequentially by shifting the focus of the imaging optical system. Owing to the group of mirrors 312, images comparable to images acquired by shifting the focus of the optical system are formed concurrently on the imaging device 12. As a result, an image comparable to an image produced by adding up images that have been acquired by shifting the focus of the optical system, and equivalent to the one graphically shown in FIG. 10 is produced. This obviates the necessity of the addition circuit 23 in the CCU 2 shown in FIG. 1.

In the apparatus of this embodiment, as mentioned above, the VCM and addition circuits are unnecessary. This is attributable to the employment of the group of mirrors 312. The operation of the group of mirrors 312 will be described below.

Light emanating from the object 3 is refracted by the objective lens 308 to be collimated into substantially parallel light rays, transmitted by the aperture stop 311 and half mirror 15, and then converged by the intermediate image formation lens 309 to form an intermediate image in the vicinity of the half mirror $HM_2$ belonging to the group of mirrors 312. Light rays reflected from the reflecting surfaces of the group of mirrors 312 are collimated into substantially parallel light rays again by means of the intermediate image formation lens 309, reflected by the half mirror 15, and converged by the image formation lens 310 to form a final image on the imaging device 12.

Figure 41:
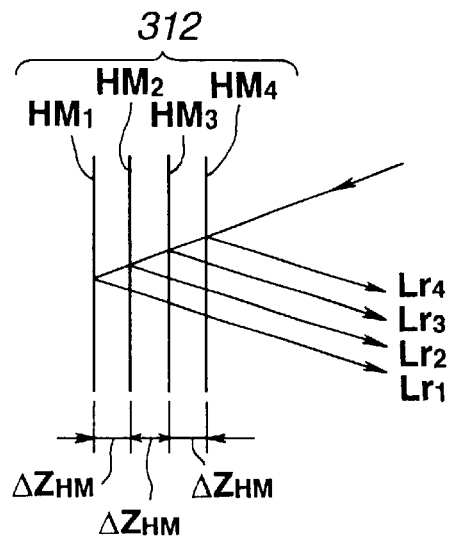
FIG. 41 is a diagram showing a reflected state of light reflected by a group of mirrors included in the image taking apparatus shown in FIG. 40.

As for light incident on the group of mirrors 312, part of the light is transmitted by the half mirrors $HM_2$, $HM_3$, and $HM_2$, and another part thereof is reflected thereby. All the light is reflected by the full-reflection mirror $HM_1$. FIG. 41 is a diagram showing reflection of light from the group of mirrors 312 in detail. Light rays reflected from the reflecting surfaces shall be referred to as reflected light rays $Lr_1$, $Lr_2$, $Lr_3$, $Lr_4$ in correspondence with the reflecting surfaces. Between a reflected light ray $Lr_n$ and a reflected light ray $Lr_{n+1}$, there is an optical path difference calculated on the basis of a distance $2 \cdot \Delta Z_{HM}$. Between the reflected light ray $Lr_1$ and reflected light ray $Lr_4$, there is an optical path difference corresponding to an optical path length calculated on the basis of a distance $6 \cdot Z_{HM}$.

The final image formed by the reflected light rays is equivalent to an image produced by integrating (adding up) images that are acquired by driving a movable mirror within a range corresponding to an amplitude $\pm 3 \cdot \Delta Z_{HM}$ using the VCM 13. It is therefore unnecessary to convert an output signal of the imaging device 12 into a digital form. Besides, addition need not be carried out. Once restoration is carried out, an image proving a large depth of field can be produced.

In the apparatus of this embodiment, it is necessary to optimize the reflectances of the full-reflection mirror $HM_1$ and half mirrors $HM_2$, $HM_3$, and $HM_4$ belonging to the group of mirrors 312 and to optimize the distance $\Delta Z_{HM}$. To begin with, optimization of the reflectances will be described below.

In the apparatus of this embodiment, as shown in FIG. 41, one full-reflection mirror and three half mirrors (or any number, k, of half mirrors) are overlapped. In this case, preferably, the intensities of light rays reflected from the reflecting surfaces should be mutually the same. Preferably, therefore, the intensities of light rays, which are reflected once in the group of mirrors 312 and then emitted, on the reflecting surfaces of the mirrors should be mutually equalized. That is to say, the relationship below should be satisfied.

$$Lr_1 = Lr_2 = Lr_3 = \ldots Lr_n = Lr_{n+1} = \ldots = Lr_k \quad (25)$$

For satisfying the expression (25), assuming that the reflectance of the n-th reflecting surface is $R_n$ and the reflectance of the (n+1)-th reflecting surface is $R_{n+1}$, the relationship below must be satisfied.

$$R_{n+1}=(1-R_{n+1})^2 \cdot Rn \quad (26)$$

Consequently, $$R_{n+1}+(2R_{n+1}-\sqrt{(2R_{n+1})^2-4R_n^2})/2R_n \quad (27)$$

The reflectances of the mirrors $HM_1$, $HM_2$, $HM_3$, and $HM_4$ calculated according to the expression (27), and transmittances $(1-R_n)$ thereof are listed in Table 1.

TABLE 1

| Mirror | Reflectance | Transmittance |
|---|---|---|
| $HM_1$ | 1.00 | 0.0 |
| $HM_2$ | 0.382 | 0.618 |
| $HM_3$ | 0.228 | 0.772 |
| $HM_4$ | 0.161 | 0.839 |

Figure 42:
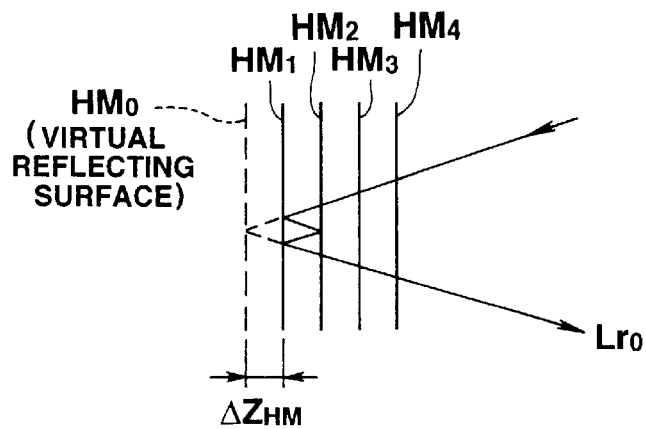
FIG. 42 is a diagram showing an example of a reflected state of light reflected three times by the group of mirrors included in the image taking apparatus shown in FIG. 40.
Figure 43:
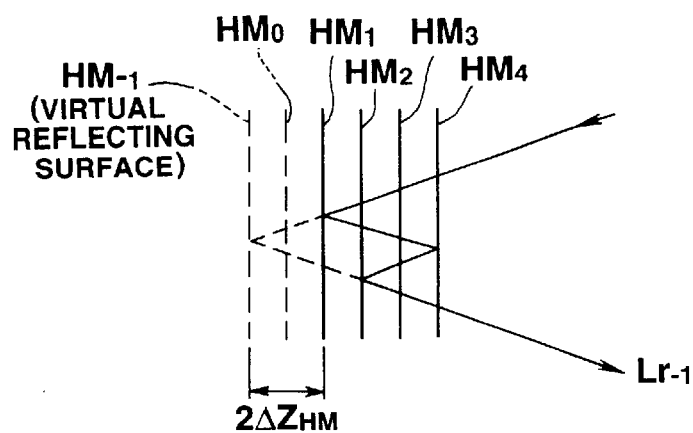
FIG. 43 is a diagram showing another example of a reflected state of light reflected three times by the group of mirrors included in the image taking apparatus shown in FIG. 40.
Figure 44:
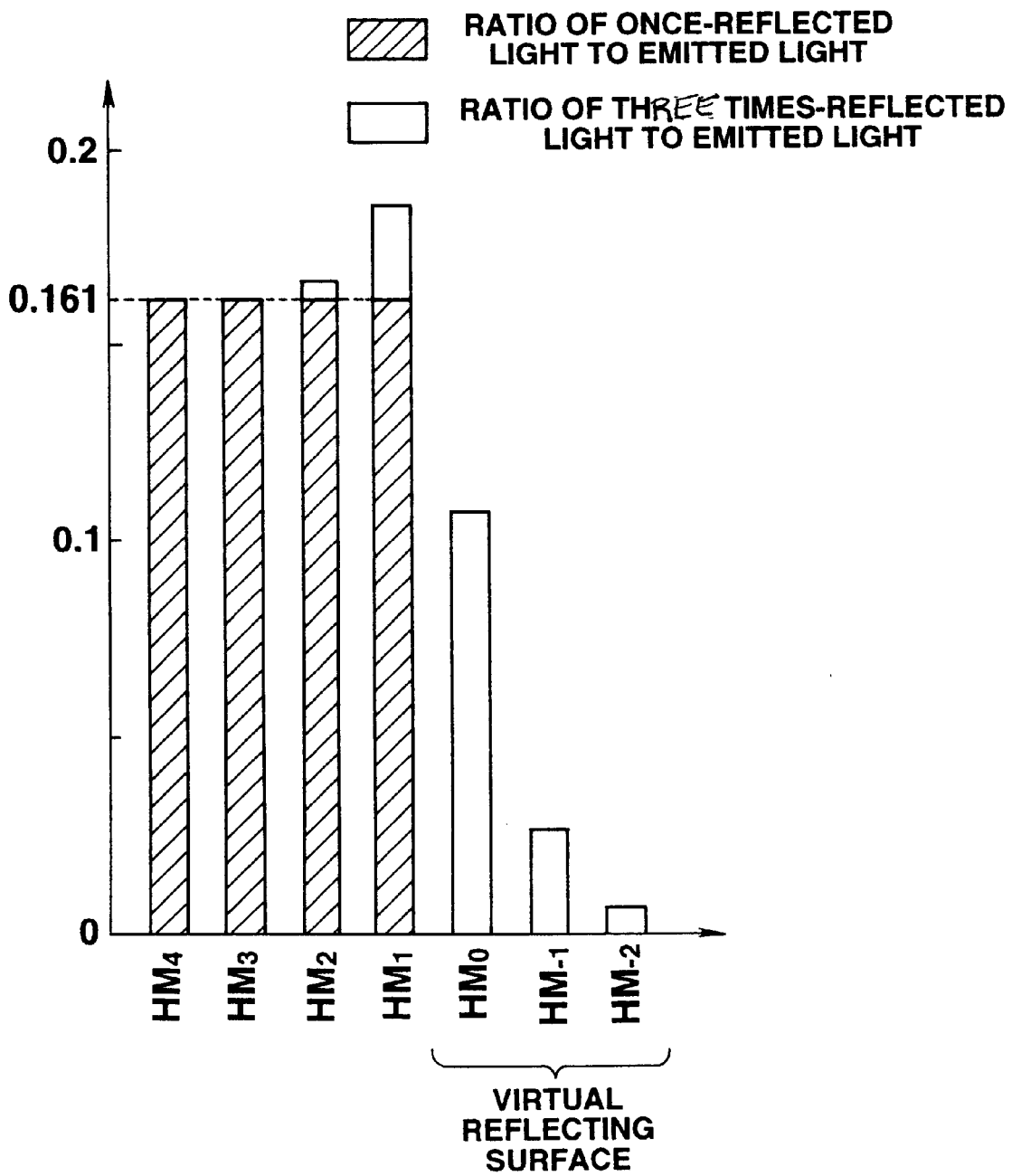
FIG. 44 is a diagram showing the ratios of light rays, which are reflected by mirrors belonging to the group of mirrors included in the image taking apparatus shown in FIG. 40, to emitted light.

Incidentally, the frequency of reflection of light emitted from the group of mirrors 312 is not limited to once. As shown in FIGS. 42 and 43 showing examples of reflected states, there are many reflection modes in which emitted light is reflected three times. When incident light rays pour into a surface of predetermined one of said plurality of said half mirrors 312 are reflected three or more times in the course of being transmitted and eventually emitted as emitted light rays through said surface therefrom, a virtual reflecting surface is defined by a relation between said light rays poured into said surface and said emitted light rays through said surface therefrom, so that said virtual reflecting surface acts as an effective reflecting surface concerning said light rays poured into and emitted therefrom. In this case, as shown in FIGS. 42 and 43, the light propagates along a longer optical path than an optical path along which light reflected once from the full-reflection mirror $HM_1$ propagates. FIG. 44 shows calculated ratios of reflected light rays that are reflected three times to emitted light, and ratios of reflected light rays that are reflected once to emitted light. In the drawing, surfaces $HM_0$, $HM_{-1}$, and $HM_{-2}$ are virtual reflecting surfaces shown in FIGS. 42 and 43. The optical path along which light reflecting from any of these virtual reflecting surfaces propagates is longer than that along which light reflecting from the full-reflection mirror HM1 propagates.

The reflectance on the virtual reflecting surface $HM_0$, as seen from FIG. 44, is so high that about 60% of light reflected once is reflected from the virtual reflecting surface. Light reflected from the virtual reflecting surface $HM_0$ therefore contributes fully to the operation of image formation. The apparatus of this embodiment can, therefore, produce an additive image substantially equivalent to an image produced by integrating images that are acquired by driving a mirror within a range $\pm 2\Delta Z_{HM}$ from the virtual reflecting surface HM0 to the half mirror $HM_4$ with the position of the mirror $HM_2$ belonging to the group of mirrors as a center position. In this case, between the light ray $Lr_0$ and light ray $Lr_4$, there is an optical path difference corresponding to an optical path length calculated on the basis of a distance $8 \cdot \Delta Z_{HM}$.

In the apparatus of this embodiment, as mentioned above, the addition circuit, VCM, and VCM driver are unnecessary. Besides, mechanical driving is not required. It is therefore possible to reduce the cost and size of an image taking apparatus offering a large depth of field. A highly reliable image taking apparatus can therefore be realized.

Moreover, for realizing this kind of apparatus as a microscope having a high power, an image on the intermediate image plane must be sufficiently enlarged in terms of efficient correction of aberrations. However, in this case, since the focus of an optical system is shifted, a displacement of a mirror located on the intermediate image plane must be large enough. In this case, the method employed in the apparatus of this embodiment, that is, the method in which a plurality of mirrors are arranged would prove more effective than the method in which a VCM or the like is used to vibrate a mirror. According to the method of this embodiment, a mirror need not be displaced by vibrating it greatly. What should be performed is merely to increase a space between mirrors, $\Delta Z_{HM}$ and to fix a full-reflection mirror and half mirrors to the body of an imaging optical system. The apparatus can therefore be realized with a very simple configuration. Moreover, an image mismatch stemming from a vibration will not occur.

In the image taking apparatus of this embodiment, it is very easy to increase or decrease the number of half mirrors constituting the group of mirrors 312 and arbitrarily selecting a width by which the depth of field is extended. Moreover, the VCM 13, movable mirror 20, and VCM driver 25 included in the image taking apparatus of the fourth embodiment shown in FIG. 33 can be replaced with the group of mirrors 312.

Next, an image taking apparatus in accordance with the sixth embodiment of the present invention will be described.

The image taking apparatus of this embodiment employs one image formation optical system and is characterized in that a plane mirror is driven to vibrate and the reflecting surface of the plane mirror is orthogonal to the optical axis of an optical system.

Figure 45:
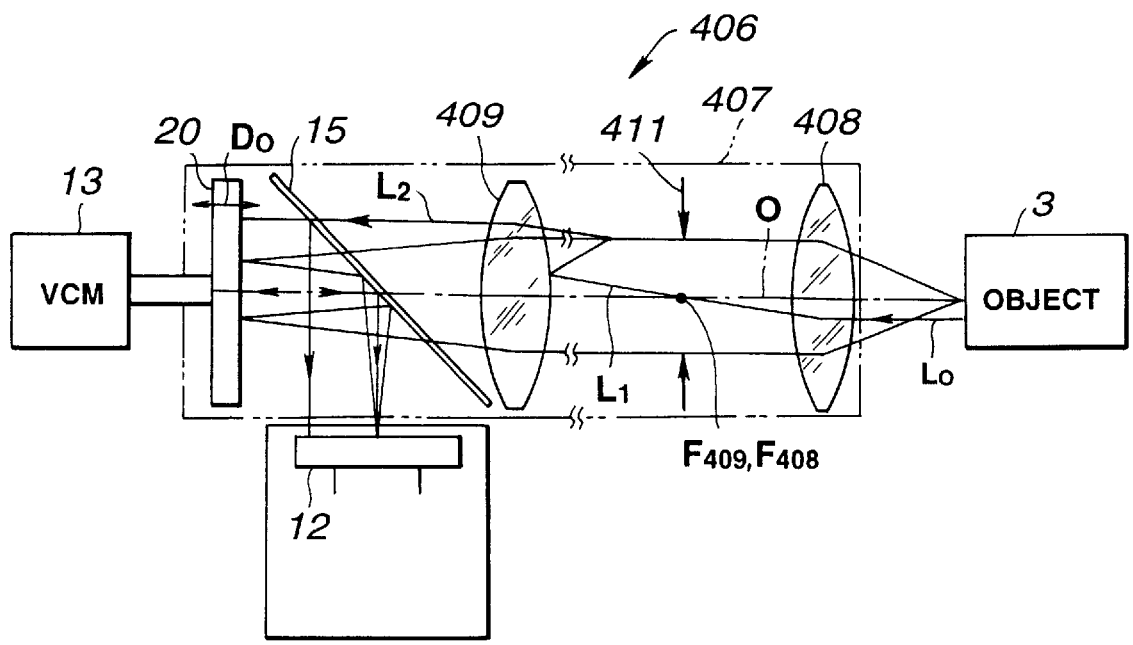
FIG. 45 is a diagram showing the components of a camera head included in an image taking apparatus in accordance with the sixth embodiment of the present invention.

FIG. 45 is a block diagram showing a camera head 406 included in the image taking apparatus of this embodiment. A CCU, motor, and the like included in the image taking apparatus other than the camera head 406 are identical to those employed in the first embodiment.

As shown in FIG. 45, the camera head 406 consists mainly of an imaging optical system 407, a VCM 13, and an imaging device 12. The VCM 13 and imaging device 12 are identical to those included in the apparatus of the first embodiment.

In the camera head 406, light emanating from an object 3 is acquired by the imaging optical system 407, and transmitted by an objective lens 408, an aperture stop 411, an image formation lens 409, and a half mirror 15 respectively. The transmitted light is reflected by a movable mirror 20 that is a plane mirror to be driven to vibrate in a direction DO by means of the VCM 13, reflected by the half mirror 15, and then converged on the imaging device 12 for formation of an image.

The aperture stop 411 is located at a focus $F_{409}$ of the image formation lens 409 and a focus $F_{408}$ of the objective lens 408. The imaging optical system 407 is therefore a telecentric system in terms of both entrance and exit images existing in the object and image spaces respectively. Primary light $L_1$ passing through the center of the aperture stop 411 propagates as light $L_0$ parallel to the optical axis 0 in the object space, and propagates as light $L_2$ parallel to the optical axis 0 even in the image space.

Addition and restoration to be performed on images acquired through the imaging device 12 by shifting the focus of the optical system are identical to those performed in the image taking apparatus of the first embodiment described in conjunction with FIGS. 15, 16, and 17.

As mentioned above, unlike the image taking apparatus of the first embodiment employing two optical systems as an image formation optical system, the image taking apparatus of this embodiment employs one image formation optical system. Images are not formed at an intermediate position but formed directly on the imaging device 12. This results in a small occupied space and high cost-efficiency. Moreover, from an optical viewpoint, aberrations can be suppressed. Moreover, since the optical system is telecentric in terms of even an entrance pupil existent in the object space, the image taking apparatus is suitable for the application to a measuring instrument for measuring the dimensions of an object using a produced image.

For some purpose of use, the optical system need not be telecentric in terms of an entrance pupil existent in the object space. In this case, a telecentric system whose exit pupil exists to infinity in the image space should be employed.

Next, an image taking apparatus in accordance with a variant of the sixth embodiment will be described.

Figure 46:
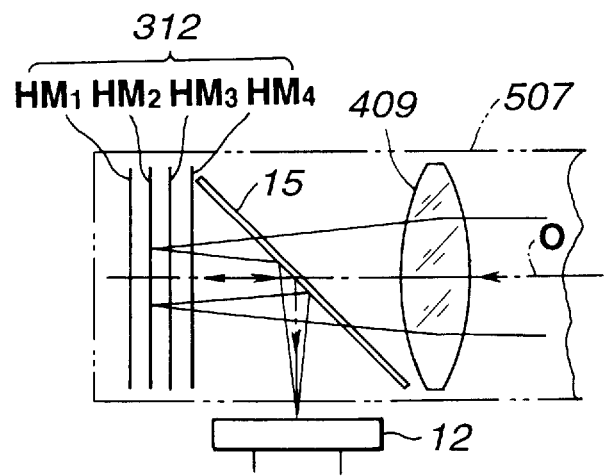
FIG. 46 is a diagram showing the components succeeding an image formation lens included in an imaging optical system in the image taking apparatus shown in FIG. 45 in accordance with a variant.

FIG. 46 is a diagram showing components succeeding the image formation lens 409 included in an imaging optical system 507 in accordance with the variant. In the imaging optical system 507 included in the apparatus of this variant, a group of mirrors 312 is substituted for the movable mirror 20. The group of mirrors 312 is the same as the group of mirrors 312 employed in the apparatus of the fifth embodiment shown in FIG. 40, and composed of one full-reflection mirror $HM_1$ and three half mirrors $HM_2$, $HM_3$, and $HM_4$.

The image taking apparatus of this variant having the foregoing components can provide the same advantage as the image taking apparatus of the sixth embodiment. In addition, since a drive unit for vibrating a mirror is unnecessary, a blur stemming from a vibration can be eliminated. Moreover, the VCM, VCM driver, and addition circuit are unnecessary. This results in a simple structure and improved reliability of the apparatus.

What is claimed is:

1. An image taking apparatus, comprising:
    an optical system structured so that mutually-parallel different reflecting surfaces can be defined sequentially or concurrently in order to define different focal points sequentially or concurrently;
    an imaging device for forming object images, which are acquired by setting said optical system to said different focal points or acquired by shifting the focus of said optical system within a range, on the imaging surface thereof and producing image information representing the object images; and
    a depth-of-field adjustment element for use in reconstructing an image equivalent to an image, which is produced by an image taking apparatus offering a larger depth of field than a depth of field attained with said optical system set to one focal point, according to image information, produced by said imaging device, representing the object images acquired by setting said optical system to said different focal points or acquired by shifting the focus of said optical system within a range.

2. An image taking apparatus according to claim 1, wherein said mutually-parallel different reflecting surfaces are defined to be orthogonal to the optical axis of said optical system.

3. An image taking apparatus according to claim 2, wherein said optical system includes a first optical system for forming intermediate images of an object and a second optical system for forming final images based on the intermediate images, and is structured so that said reflecting surfaces will be located at first positions at which the intermediate images are formed or second positions near the first positions.

4. An image taking apparatus according to claim 3, wherein said reflecting surfaces are defined by a plane mirror that is displaced in a vibrational manner, and the position of the plane mirror is varied sequentially.

5. An image taking apparatus according to claim 3, wherein said reflecting surfaces include the reflecting surfaces of a plurality of half mirrors, and the positions of the plurality of half mirrors are set to be concurrently different from one another.

6. An image taking apparatus according to claim 5, wherein when incident light rays are incident upon a surface of a predetermined one of said plurality of said half mirrors and are reflected three or more times in the course of being transmitted and eventually emitted as emitted light rays through said surface therefrom, a virtual reflecting surface is defined by a relation between said light rays incident upon said surface and said emitted light rays through said surface therefrom, so that said virtual reflecting surface acts as an effective reflecting surface with respect to said light rays incident upon into and emitted therefrom.

7. An image taking apparatus according to claim 2, wherein said optical system serves as a single optical system structured to form the images of an object on the imaging surface without forming any intermediate image.

8. An image taking apparatus according to claim 7, wherein said reflecting surfaces are defined by a plane mirror that is displaced in a vibrational manner, and the position of the plane mirror is varied sequentially.

9. An image taking apparatus according to claim 7, wherein said reflecting surfaces include the reflecting surfaces of a plurality of half mirrors, and the positions of the plurality of half mirrors are set to be concurrently different from one another.

10. An image taking apparatus according to claim 9, wherein when incident light rays are incident upon a surface of a predetermined one of said plurality of said half mirrors and are reflected three or more times in the course of being transmitted and eventually emitted as emitted light rays through said surface therefrom, a virtual reflecting surface is defined by a relation between said light rays incident upon into said surface and said emitted therefrom light rays through said surface therefrom, so that said virtual reflecting surface acts as an effective reflecting surface with respect to said light rays incident upon into and emitted therefrom.

11. An image taking apparatus according to claim 7, wherein principal light rays falling on said reflecting surfaces in said optical system are substantially parallel to one another.

12. An image taking apparatus according to claim 1, wherein said mutually-parallel different reflecting surfaces are non-orthogonal to the optical axis of said optical system.

13. An image taking apparatus according to claim 12, wherein said optical system includes a first optical system for forming intermediate images of the subject and a second optical system for forming final images based on the intermediate images, and said reflecting surfaces are defined at first positions at which the intermediate images are formed or at second positions near the first positions.

14. An image taking apparatus according to claim 13, wherein said reflecting surfaces are defined by a plane mirror that is displaced in a vibrational manner, and the position of the plane mirror is varied sequentially.

15. An image taking apparatus according to claim 13, wherein said reflecting surfaces include the reflecting surfaces of a plurality of half mirrors, and the positions of the plurality of half mirrors are set to be concurrently different from one another.

16. An image taking apparatus according to claim 15, wherein when incident light rays are incident upon a surface of predetermined one of said plurality of said half mirrors and are reflected three or more times in the course of being transmitted and eventually emitted as emergent rays through said surface therefrom, a virtual reflecting surface is defined by a relation between said light rays incident upon said surface and said emergent rays through said surface therefrom, so that said virtual reflecting surface acts as an effective reflecting surface with respect to said light rays incident upon and emitted therefrom.

17. An image taking apparatus according to claim 12, wherein said optical system serves as one optical system structured to form the images of an object on the imaging surface without forming any intermediate image.

18. An image taking apparatus according to claim 17, wherein said reflecting surfaces are defined by a plane mirror that is displaced in a vibrational manner, and the positions of the plane mirror is varied sequentially.

19. An image taking apparatus according to claim 17, wherein said reflecting surfaces include the reflecting surfaces of a plurality of half mirrors, and the positions of the plurality of half mirrors are set to be concurrently different from one another.

20. An image taking apparatus according to claim 19, wherein when incident light rays are incident upon a surface of predetermined one of said plurality of said half mirrors and are reflected three or more times in the course of being transmitted and eventually emitted as principal light rays through said surface therefrom, a virtual reflecting surface is defined by a relation between said light rays incident upon said surface and said emergent rays through said surface therefrom, so that said virtual reflecting surface acts as an effective reflecting surface with respect to said light rays incident upon and emitted therefrom.

21. An image taking apparatus according to claim 17, wherein principal light rays incident on said reflecting surfaces in said optical system are substantially parallel to one another.

22. An image taking apparatus according to claim 12, wherein said depth-of-field adjusting element includes a restoration element for filtering spatial frequencies at two dimensions so as to reconstruct an image on the basis of image information, produced by said imaging device, representing object images acquired by setting said optical system to said different focal points or acquired by shifting the focus of said optical system within a range, and the characteristic of said restoration element with respect to filtering of spatial frequencies at two dimensions is expressed with a characteristic curve that when rotated, is asymmetric with respect to an origin of the system of coordinates indicating spatial frequencies.

23. An image taking apparatus, comprising:
a first optical system for forming intermediate images on intermediate image planes that are optically conjugate to object planes defined in the vicinity of an object to be observed;
a mirror reflecting light rays coming from said first optical system toward said intermediate image planes along an optical axis of a second optical system;
a second optical system for receiving light rays reflected from said mirror and forming final images on final image planes that are optically conjugate to said intermediate image planes;
an imaging means located so that the imaging surface thereof can be positioned on said final image planes; and
a mirror driving means for changing the position of said mirror along an optical axis of said first optical system.

24. An image taking apparatus according to claim 23, wherein a half mirror is placed on an optical path in said first optical system, light reflected from said mirror is further reflected from said half mirror, and said second optical system is placed along an optical axis of said half mirror.

25. An image taking apparatus according to claim 23, wherein a plurality of final images are produced by said imaging means, said apparatus further comprising a depth of field adjusting means for reconstructing an object image providing a large depth of field using said plurality of final images.

26. An image taking apparatus according to claim 25, wherein said depth-of-field adjusting means includes an adding means for adding up said plurality of final images formed by said imaging means, and a restoring means for restoring an image produced by said adding means by filtering spatial frequencies.

27. An image taking apparatus according to claim 23, wherein at least one of said first optical system and second optical system is telecentric in terms of an intermediate image.

28. An image taking apparatus according to claim 27, wherein a magnification changing means for changing the magnification of an image of an object to be formed on the final image plane is included in either said first optical system or second optical system that is not telecentric in terms of an exit or entrance pupil equivalent to an intermediate image.

* * * * *